(12) United States Patent
Gandhi et al.

(10) Patent No.: US 11,765,581 B2
(45) Date of Patent: Sep. 19, 2023

(54) BOOTSTRAPPING FAST TRANSITION (FT) KEYS ON WIRELESS LOCAL AREA ACCESS NETWORK NODES BASED ON PRIVATE WIRELESS WIDE AREA ACCESS NETWORK INFORMATION

(71) Applicant: Cisco Technology, Inc., San Jose, CA (US)

(72) Inventors: Indermeet Singh Gandhi, San Jose, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 125 days.

(21) Appl. No.: 17/069,056

(22) Filed: Oct. 13, 2020

(65) Prior Publication Data
US 2021/0306850 A1   Sep. 30, 2021

Related U.S. Application Data

(60) Provisional application No. 63/002,521, filed on Mar. 31, 2020.

(51) Int. Cl.
*H04W 12/041* (2021.01)
*H04W 12/0431* (2021.01)
(Continued)

(52) U.S. Cl.
CPC ........ *H04W 12/041* (2021.01); *H04B 17/318* (2015.01); *H04W 8/24* (2013.01);
(Continued)

(58) Field of Classification Search
CPC ........... H04W 12/041; H04W 12/0431; H04W 12/06; H04W 12/50; H04W 36/0058;
(Continued)

(56) References Cited

U.S. PATENT DOCUMENTS

| 7,788,492 B2 | 8/2010 | Cam Winget |
| 7,873,352 B2 | 1/2011 | Nguyen et al. |

(Continued)

FOREIGN PATENT DOCUMENTS

| CA | 2 546 543 A1 | 11/2006 |
| EP | 1672945 A1 | 6/2006 |

(Continued)

OTHER PUBLICATIONS

3GPP, "3rd Generation Partnership Project; Technical Specification Group Services and System Aspects; Security architecture and procedures for 5G system (Release 16)," 3GPP TS 33.501 V16.4.0, Sep. 2020, 250 pages.

(Continued)

*Primary Examiner* — Kendall Dolly
(74) *Attorney, Agent, or Firm* — Edell, Shapiro & Finnan, LLC

(57) ABSTRACT

Presented herein are techniques to provide for the ability to optimize the caching of Fast Transition (FT) hierarchical keys based on a derived or statically defined neighbor relationship between wireless wide area (WWA) access network nodes and wireless local area (WLA) access network nodes and also user equipment (UE) mobility triggers in the WWA access network. In one example, a method may include instructing a UE to report detection of a WLA access network and based, at least in part, on obtaining a notification via a WWA access node indicating UE detection of the WLA access network, identifying WLA access nodes that neighbor the WWA access node. The method may further include generating FT key material for the UE and communicating a portion of the FT key material to the WLA access nodes that neighbor the WWA access node to facilitate authenticating the UE to the WLA access network.

20 Claims, 10 Drawing Sheets

(51) Int. Cl.

| | | |
|---|---|---|
| *H04W 12/06* | (2021.01) | |
| *H04W 12/50* | (2021.01) | |
| *H04W 8/24* | (2009.01) | |
| *H04W 84/12* | (2009.01) | |
| *H04B 17/318* | (2015.01) | |

(52) U.S. Cl.
CPC ....... *H04W 12/0431* (2021.01); *H04W 12/06* (2013.01); *H04W 12/50* (2021.01); *H04W 84/12* (2013.01)

(58) Field of Classification Search
CPC ....... H04W 36/00835; H04W 36/0085; H04W 36/14; H04W 8/24; H04W 84/12; H04W 88/06; H04B 17/318
See application file for complete search history.

(56) References Cited

U.S. PATENT DOCUMENTS

| | | |
|---|---|---|
| 8,023,484 B1 | 9/2011 | Huang et al. |
| 8,036,222 B1 | 10/2011 | Huang et al. |
| 8,559,392 B2 | 10/2013 | Ramankutty et al. |
| 8,725,138 B2 | 5/2014 | Lee et al. |
| 8,959,598 B2 | 2/2015 | Smith |
| 9,264,900 B2 | 2/2016 | Sun et al. |
| 9,699,601 B2 | 7/2017 | Grayson et al. |
| 9,820,199 B2* | 11/2017 | McCann ........... H04W 36/0077 |
| 9,826,401 B2 | 11/2017 | Carames et al. |
| 10,015,713 B2 | 7/2018 | Hedberg et al. |
| 10,039,151 B1 | 7/2018 | Upp et al. |
| 10,080,097 B2 | 9/2018 | Grayson et al. |
| 10,165,608 B2 | 12/2018 | Grayson et al. |
| 10,257,753 B2 | 4/2019 | Sirotkin et al. |
| 10,432,463 B2 | 10/2019 | Likar |
| 10,750,366 B1 | 8/2020 | Gundavelli et al. |
| 10,785,652 B1 | 9/2020 | Ravindranath et al. |
| 11,070,974 B2 | 7/2021 | Dodd-Noble et al. |
| 11,108,773 B1 | 8/2021 | Dhani Reddy |
| 2003/0069030 A1 | 4/2003 | Mukherjee |
| 2004/0242228 A1 | 12/2004 | Lee et al. |
| 2006/0256763 A1* | 11/2006 | Nguyen ............ H04W 12/0431 370/338 |
| 2007/0064647 A1 | 3/2007 | Prasad |
| 2007/0110009 A1 | 5/2007 | Bachmann et al. |
| 2007/0206537 A1 | 9/2007 | Cam-Winget et al. |
| 2010/0002626 A1 | 1/2010 | Schmidt et al. |
| 2010/0035578 A1 | 2/2010 | Ahmed |
| 2010/0199332 A1 | 8/2010 | Bachmann et al. |
| 2013/0176897 A1 | 7/2013 | Wang et al. |
| 2013/0305332 A1* | 11/2013 | Narasimhan ...... H04W 36/0038 726/7 |
| 2013/0336210 A1 | 12/2013 | Connor et al. |
| 2014/0050320 A1 | 2/2014 | Choyi et al. |
| 2014/0328193 A1 | 11/2014 | Horn et al. |
| 2016/0066234 A1* | 3/2016 | Cho ................... H04W 36/0085 370/331 |
| 2016/0112869 A1* | 4/2016 | Lee ....................... H04W 12/50 713/171 |
| 2016/0127897 A1 | 5/2016 | Lee et al. |
| 2016/0127903 A1 | 5/2016 | Lee et al. |
| 2016/0373992 A1 | 12/2016 | Jung et al. |
| 2017/0078874 A1 | 3/2017 | Lee et al. |
| 2017/0134940 A1 | 5/2017 | Sharma et al. |
| 2017/0223531 A1 | 8/2017 | Mestanov et al. |
| 2017/0230826 A1 | 8/2017 | Mestanov et al. |
| 2018/0020383 A1 | 1/2018 | Sirotkin et al. |
| 2018/0041930 A1* | 2/2018 | Hampel ................. H04W 76/11 |
| 2018/0145982 A1 | 5/2018 | Wang et al. |
| 2018/0184297 A1 | 6/2018 | Mohamed et al. |
| 2018/0184345 A1* | 6/2018 | Likar ................. H04W 12/0431 |
| 2018/0206117 A1 | 7/2018 | Stahl |
| 2018/0262978 A1 | 9/2018 | Kahn et al. |
| 2018/0332442 A1 | 11/2018 | Shaw et al. |
| 2018/0352490 A1 | 12/2018 | Hu et al. |
| 2019/0007376 A1 | 1/2019 | Norrman et al. |
| 2019/0037390 A1 | 1/2019 | Hooda et al. |
| 2019/0037613 A1 | 1/2019 | Anantharaman et al. |
| 2019/0053049 A1 | 2/2019 | Kunz et al. |
| 2019/0230510 A1 | 7/2019 | Ben Henda et al. |
| 2019/0253407 A1 | 8/2019 | Livanos et al. |
| 2019/0268759 A1 | 8/2019 | Targali |
| 2019/0313318 A1* | 10/2019 | Pawar .................. H04M 15/62 |
| 2020/0153871 A1 | 5/2020 | Lei et al. |
| 2020/0162889 A1* | 5/2020 | Desai ..................... H04W 8/24 |
| 2020/0204984 A1 | 6/2020 | Dodd-Noble et al. |
| 2021/0084493 A1* | 3/2021 | Naribole ............... H04W 12/06 |
| 2021/0105632 A1 | 4/2021 | Pazyhannur et al. |
| 2021/0124850 A1 | 4/2021 | Messervy et al. |
| 2021/0185506 A1 | 6/2021 | Gundavelli et al. |
| 2021/0195399 A1 | 6/2021 | Li et al. |
| 2021/0218744 A1 | 7/2021 | Gandhi et al. |
| 2021/0281445 A1 | 9/2021 | Trim et al. |
| 2021/0385742 A1 | 12/2021 | Liao |
| 2022/0330008 A1 | 10/2022 | Balasubramanian |

FOREIGN PATENT DOCUMENTS

| | | |
|---|---|---|
| EP | 3494727 B1 | 5/2020 |
| WO | 2009008627 A2 | 1/2009 |
| WO | 2018026551 A1 | 2/2018 |

OTHER PUBLICATIONS

CableLabs, "A Comparative Introduction to 4G and 5G Authentication," https://www.cablelabs.com/insights/a-comparative-introduction-to-4g-and-5g-authentication, Feb. 2019, 19 pages.

Aboba, et al., "Extensible Authentication Protocol (EAP)," Network Working Group, Request for Comments: 3748, Standards Track, Jun. 2004, 67 pages.

Arkko, et al., "Extensible Authentication Protocol Method for 3rd Generation Authentication and Key Agreement (EAP-AKA)," Network Working Group, Request for Comments: 4187, Informational, Jan. 2006, 79 pages.

Simon, et al., "The EAP-TLS Authentication Protocol," Network Working Group, Request for Comments: 5216, Standards Track, Mar. 2008, 34 pages.

Aboba, et al., "Extensible Authentication Protocol (EAP) Key Management Framework," Network Working Group, Request for Comments: 5247, Standards Track, Aug. 2008, 79 pages.

Funk, et al., "Extensible Authentication Protocol Tunneled Transport Layer Security Authenticated Protocol Version 0 (EAP-TTLSv0)," Network Working Group, Request for Comments: 5281, Informational, Aug. 2008, 51 pages.

Arkko, et al., "Improved Extensible Authentication Protocol Method for 3rd Generation Authentication and Key Agreement (EAP-AKA')," Network Working Group, Request for Comments: 5448, Informational, May 2009, 29 pages.

Kaufman, et al., "Internet Key Exchange Protocol Version 2 (IKEv2)," Internet Engineering Task Force (IETF), Request for Comments: 7296, Standards Track, Oct. 2014, 142 pages.

Cisco, "802.11r Fast Transition Roaming," 802.11r, 802.11k, and 802.11w Deployment Guide, Cisco IOS-XE Release 3.3, Jul. 2015, 8 pages.

ETSI, "LTE; Evolved Universal Terrestrial Radio Access (E-UTRA); Radio Resource Control (RRC) Protocol specification (3GPP TS 36.331 version 15.3.0 Release 15)," ETSI TS 136 331 V15.3.0, Oct. 2018, pp. 604-607.

International Search Report and Written Opinion in counterpart International Application No. PCT/US2021/024118, dated Jun. 15, 2021, 14 pages.

ETSI, "5G; Security architecture and procedures for 5G System (3GPP TS 33.501 version 15.1.0 Release 15)", ETSI TS 133 501 V15.1.0, Jul. 2018, 150 pages.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, 549 pages.

(56) References Cited

OTHER PUBLICATIONS

ETSI, "Digital cellular telecommunications system (Phase 2+) (GSM); Universal Mobile Telecommunications System (UMTS); LTE; 3GPP System Architecture Evolution (SAE); Security aspects of non-3GPP accesses (3GPP TS 33.402 version 14.2.0 Release 14)", ETSI TS 133 402 V14.2.0, Jul. 2017, 72 pages.

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1, Jun. 2019, 549 pages.

P. Eronen, Ed. et al., "Diameter Extensible Authentication Protocol (EAP) Application", Network Working Group, Request for Comments: 4072, Category: Standards Track, Aug. 2005, 33 pages.

3GPP, "3rd Generation Partnership Project; Technical Specification Group Core Network and Terminals; 5G System Session Management Services; Stage 3 (Release 16)", 3GPP TS 29.502 V16.4.0, Jul. 2020, 256 pages.

3GPP, "3rd Generation Partnership Project; Technical Specification Group Services and System Aspects; Security architecture and procedures for 5G system (Release 16)", 3GPP TS 33.501 V16.2.0, Mar. 2020, 227 pages.

Stuart J. Kerry et al., "Part 11: Wireless LAN Medium Access Control (MAC) and Physical Layer (PHY) Specifications Amendment 2: Fast Basic Service Set (BSS) Transition", IEEE Std. 802.11r-2008, LAN/MAN Standards Committee of the IEEE Computer Society, Jul. 15, 2008, 126 pages.

ETSI, "LTE; Evolved Universal Terrestrial Radio Access (E-UTRA); Radio Resource Control (RRC); Protocol specification (3GPP TS 36.331 version 15.3.0 Release 15)," ETSI TS 136 331 V15.3.0, Oct. 2018, pp. 230-239.

ETSI, "Universal Mobile Telecommunications System (UMTS); LTE; Access to the 3GPP Evolved Packet Core (EPC) via non-3GPP access networks; Stage 3 (3GPP TS 24.302 version 15.3.0 Release 15)," ETSI TS 124 302 V15.3.0, Jun. 2018, 171 pages.

Johnson, et al., "dLTE: Building a more Wifi-like Cellular Network," Proceedings of the 17th ACM Workshop on Hot Topics in Networks, Nov. 2018, 7 pages.

Tabassam, et al., "Fast and Seamless Handover for Secure Mobile Industrial Applications with 802.11r," The 5th IEEE International Workshop on Performance and Management of Wireless and Mobile Networks (P2MNET 2009), Oct. 2009, 8 pages.

Elsadek, et al., "Inter-Domain Mobility Management using SDN For Residential/Enterprise Real Time Services," 2016 4th International Conference on Future Internet of Things and Cloud Workshops, Aug. 2016, 8 pages.

Prados-Garzon, et al., "5G Non-Public Networks: Standardization, Architectures and Challenges," IEEE Access, vol. 9, Nov. 2021, 16 pages.

3GPP, "3rd Generation Partnership Project; Technical Specification Group Radio Access Network; Evolved Universal Terrestrial Radio Access (E-UTRA); User Equipment (UE) procedures in idle mode (Release 16)," TS 36.304 V16.1.0, Jul. 2020, 63 pages.

3GPP, "3rd Generation Partnership Project; Technical Specification Group Core Network and Terminals; Access Network Discovery and Selection Function (ANDSF) Management Object (MO) (Release 16)," TS 24.312 V16.0.0, Jul. 2020, 394 pages.

* cited by examiner

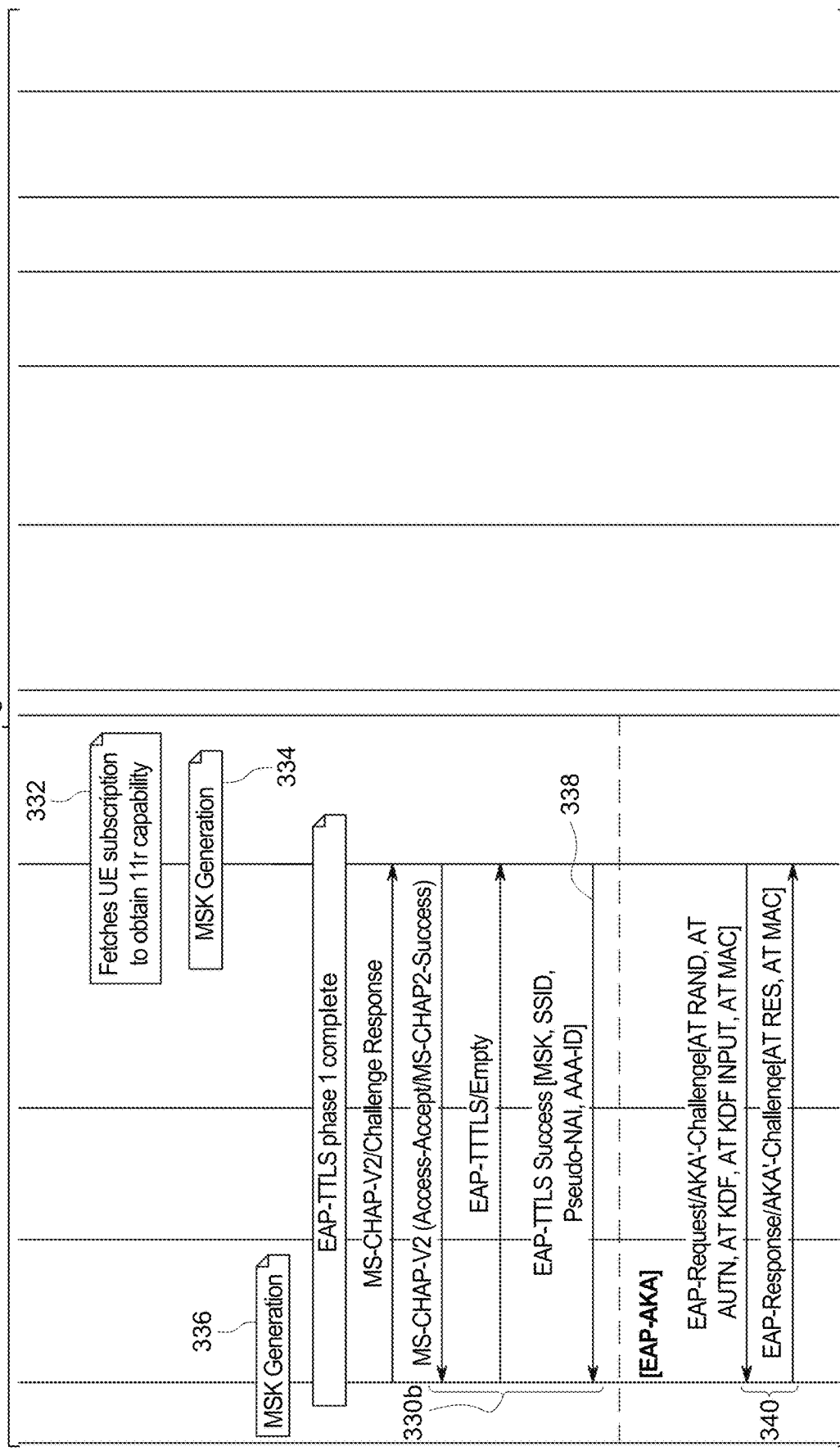

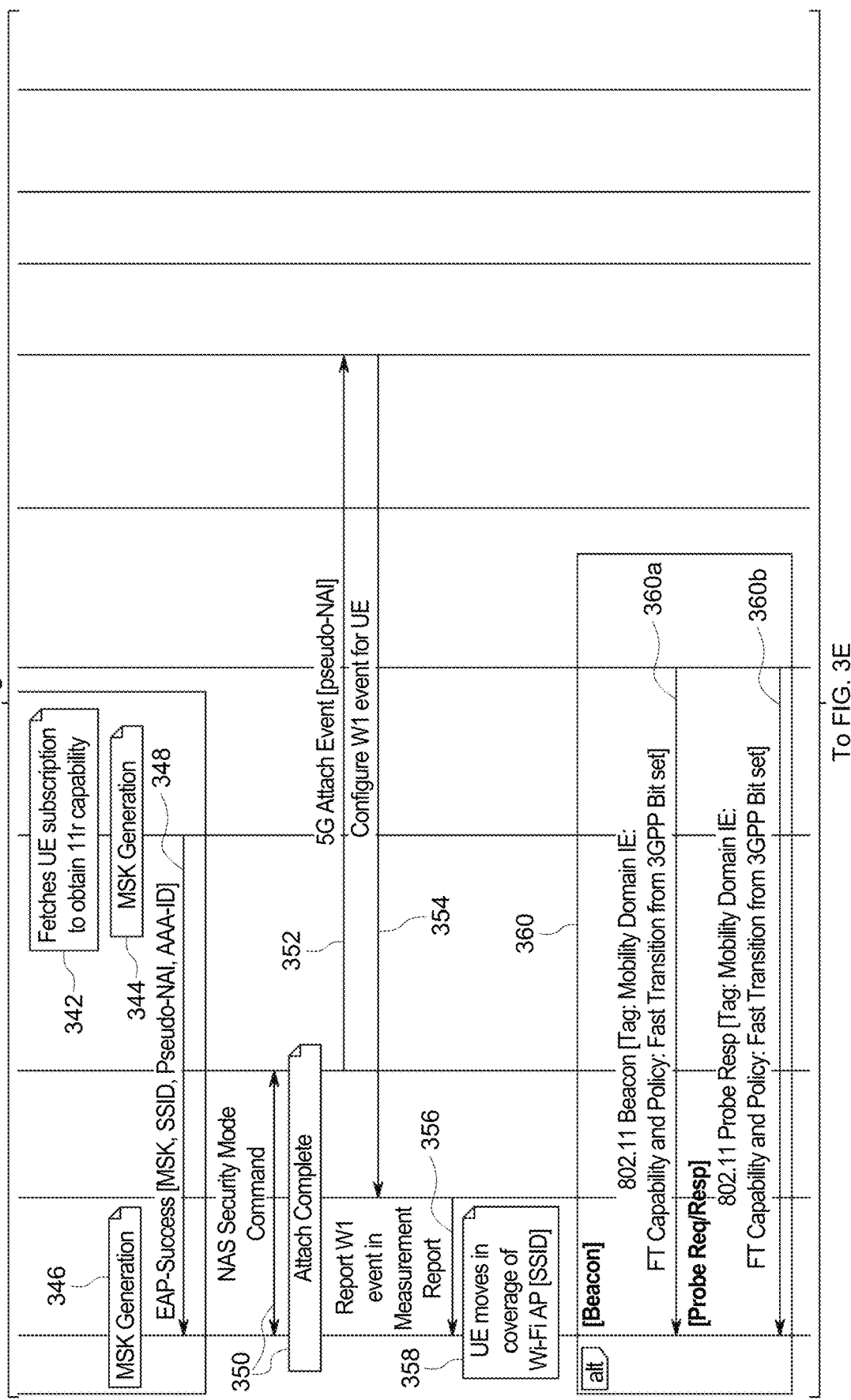

US 11,765,581 B2

BOOTSTRAPPING FAST TRANSITION (FT) KEYS ON WIRELESS LOCAL AREA ACCESS NETWORK NODES BASED ON PRIVATE WIRELESS WIDE AREA ACCESS NETWORK INFORMATION

PRIORITY CLAIM

This application claims the benefit of priority under 35 U.S.C. § 119 to U.S. Provisional Application No. 63/002,521, filed Mar. 31, 2020, the entirety of which is incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in facilitating roaming between different networks.

BRIEF DESCRIPTION OF THE DRAWINGS

FIGS. 3A, 3B, 3C, 3D, 3E, and 3F are a message sequence diagram illustrating a call flow associated with bootstrapping FT keys on WLA access nodes based on private WWA access network information utilizing the system of FIG. 1, according to an example embodiment.

DESCRIPTION OF EXAMPLE EMBODIMENTS

Overview

Figure 1:
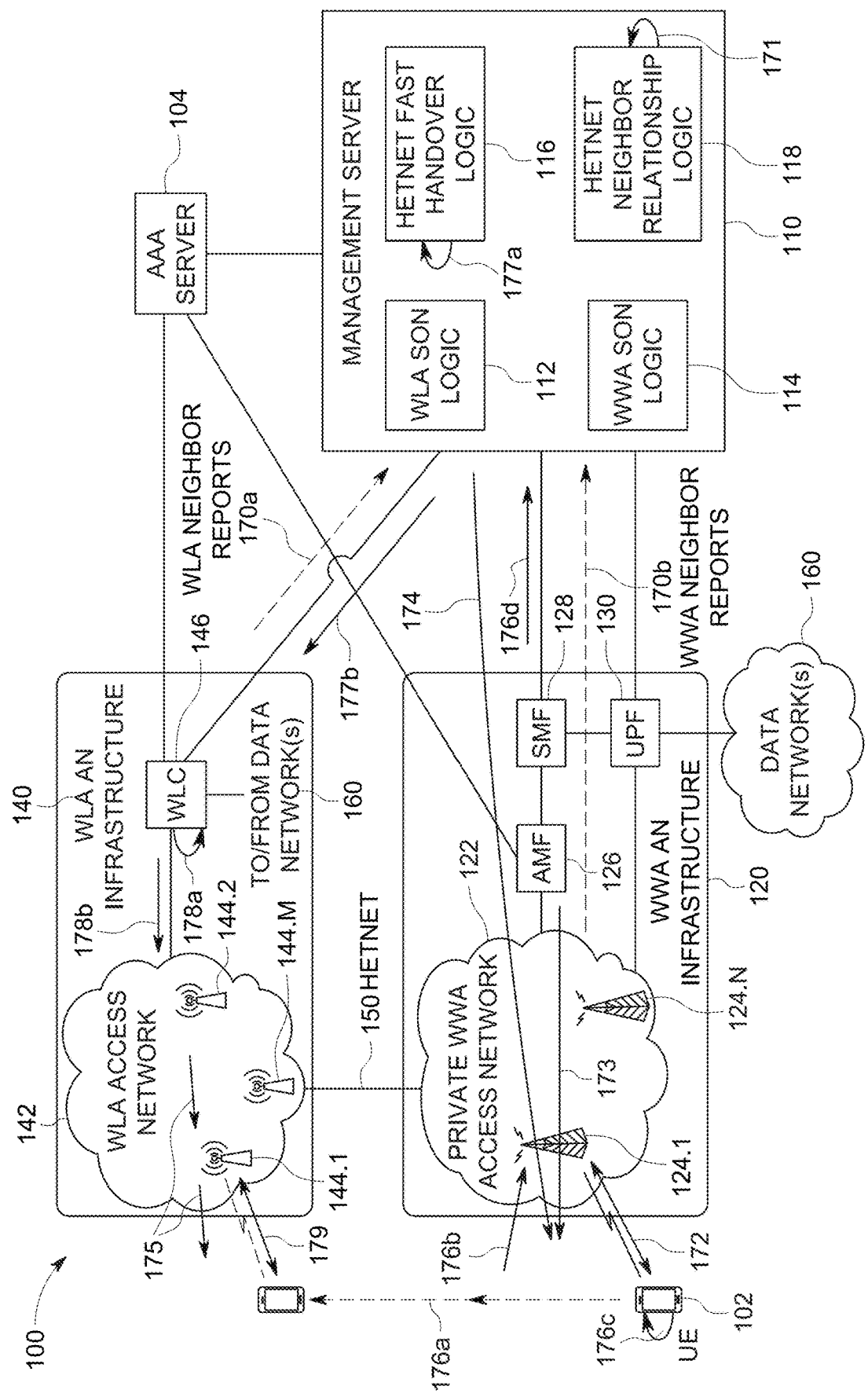
FIG. 1 is a diagram of a system in which techniques may be implemented to provide for bootstrapping Fast Transition (FT) keys on wireless local area (WLA) access nodes based on private wireless wide area (WWA) access network information, according to an example embodiment.

Techniques presented herein may provide for the ability to optimize the caching of Fast Transition (FT) hierarchical keys based on derived neighbor relationships between one or more wireless wide area (WWA) access network radios, such as Third (3rd) Generation Partnership Project (3GPP) Fifth (5th) Generation (5G) and/or next Generation (nG) radios (e.g., next generation Node Bs (gNBs or gNodeBs) and one or more wireless local area (WLA) access network radios, such as Wi-Fi® radios or access points (APs), and also user equipment (UE) mobility triggers in the WWA access network.

In one embodiment, a method is provided that may include instructing a UE to report detection of a WLA access network while the UE is connected to a WWA access network; based, at least in part, on obtaining a notification via a WWA access network access node indicating UE detection of the WLA access network, identifying one or more WLA access network access nodes that neighbor the WWA access network access node; obtaining a root security key for the UE; generating fast transition key material for the UE based on the root security key; and communicating a portion of the fast transition key material for the UE to the one or more WLA access network access nodes that neighbor the WWA access network access node to facilitate authenticating the UE to connect to the WLA access network.

Example Embodiments

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizens Broadband Radio Service (CBRS)

access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) in some instances. Cisco is a registered trademark of Cisco Technology, Inc. AT&T is a registered trademark of AT&T Intellectual Property.

As industry moves closer towards private 3GPP WWA access network deployments (e.g., 4G/LTE, 5G, nG deployments) based on technologies such as CBRS and other shared spectrum bands in other regulatory domains, enterprises may deploy private 5G/LTE access networks for outdoor access (e.g., for areas such as campuses, parking lots, basement, ports, industrial areas, amusement parks, areas between buildings, etc.) while maintaining WLA access networks, such as Wi-Fi®, Wi-Fi6®, etc., for indoor access. It is reasonable to assume that both WWA and WLA radio access technologies will co-exist in many deployments in order to provide blanket coverage with no gaps. Thus, interworking between the control plane elements of these access networks with a unified policy layer may be advantageous to deliver better user experience.

For current systems, when a UE moves to a WLA access (e.g., a Wi-Fi access) from a 3GPP WWA access, the UE first has to establish IEEE 802.11 open authentication and association, followed by IEEE 802.1x authentication, and then followed by a 4-way handshake to derive encryption keys for communication establishment. These steps involve an exchange of multiple messages between the UE and the WLA access network and can result in a delay of up to 8-10 seconds before ports are unblocked for a WLA link (e.g., a Wi-Fi link) to for the UE to transmit or receive data.

With enterprises interested in the deployment of private WWA access networks, such as 4G/LTE and/or 5G/nG networks, there is a desire and opportunity to optimize the connection establishment to a WLA access network by leveraging key material generated from a UE's authentication to a WWA access network over a private 3GPP access.

With this objective in mind, presented herein are techniques that enable leveraging session keys generated via a 3GPP WWA access network connection (5G/LTE) and leveraging an IEEE 802.11r Fast Transition (FT) capability of a WLA access network infrastructure to derive fast roaming FT key material as a user/UE moves from a private 3GPP WWA access for an enterprise to a WLA access of the enterprise. IEEE 802.11r introduces a new concept of roaming in which an initial handshake with a new Wi-Fi AP is performed even before the client roams to the target AP, which is called Fast Transition (FT) or Fast Basic Service Set (BSS) transition. This initial handshake allows the client and APs to reuse the master keys obtained during a prior authentication exchange within the same BSS/mobility domain.

Broadly, techniques herein may enable caching or 'bootstrapping' FT hierarchical key material at one or more WLA access point(s) (AP(s)) or nodes based on a derived neighbor relationship between 3GPP WWA access nodes and WLA access nodes and also UE mobility triggers obtained via the 3GPP WWA access. FT hierarchical key material may include a first level FT key, such as a Pairwise Master Key R0 (PMK-R0) key, and a second level FT key, such as a PMK R1 (PMK-R1) key. The first level key, PMK-R0, is derived or generated using a root security key, such as a Master Session Key (MSK) generated for a UE utilizing an Extensible Authentication Protocol (EAP) MSK generation processes as defined at least by Internet Engineering Task Force (IETF) Request For Comments (RFC) 5247). The second level FT key, PMK-R1, is derived or generated from the PMK-R0, as also prescribed by RFC 5247. Thus, techniques presented herein may facilitate bootstrapping FT keys on WLA access nodes based on private WWA access network information including, but not limited to, UE mobility events and/or proximity considerations/relationships between WLA access nodes and WWA access nodes.

As referred to herein, the terms 'FT keys,' 'hierarchical keys', and variations thereof can be used interchangeably to refer to FT hierarchical keys, PMK-R0, PMK-R1, etc. that may be used to facilitate 802.11r Fast Transition for a UE from one access to another access (e.g., 802.11r Fast Transition from a WWA access to a WLA access).

In some instances, utilization of techniques as described herein may result in a drastic reduction of connection establishment time to the WLA access (potentially upwards of a 90% reduction in connection time). This is a significant gain for latency sensitive applications (e.g., Ultra-Reliable Low-Latency Communication (URLLC) applications, industrial Internet of Things (IoT) applications, video applications, Augmented Reality/Virtual Reality (AR/VR) applications, cloud gaming applications, etc.) and may thereby greatly improve the real-time application experience in enterprise networks.

Referring to FIG. 1, FIG. 1 is a block diagram of a system 100 in which techniques may be implemented to facilitate bootstrapping FT keys on WLA access nodes based on private WWA access network information, according to an example embodiment. System 100 includes a user equipment (UE) 102, an Authentication, Authorization, and Accounting (AAA) server 104, an analytics or management server 110, a WWA access network (AN) infrastructure 120, and a WLA AN infrastructure 140. Also shown in system 100 is one or more data network(s) 160.

The management server 110 may include WLA self-organizing network (SON) logic 112, WWA SON logic 114, heterogeneous network (HetNet) fast handover logic 116, and HetNet neighbor relationship logic 118. The WWA AN infrastructure 120 may include a private WWA AN 122, an Access and Mobility Management Function (AMF) 126, a Session Management Function (SMF) 128, and at least one User Plane Function (UPF) 130. The private WWA AN 122 may include any 'N' number of WWA access nodes 124.1-124.N. The WLA AN infrastructure 140 may include a WLA AN 142 and a wireless local area network (LAN) controller (WLC) 146. The WLA AN 142 may include any 'M' number of WLA access nodes (also referred to herein as APs) 144.1-144.M.

In one instance, AAA server 104, management server 110, the WWA AN infrastructure 120, and the WLA AN infrastructure 140 may collectively represent an enterprise network, which may provide services to one or more enterprise devices, such as UE 102, via a HetNet 150 in which the HetNet 150 may represent an access network in which the access network coverage areas for both the WWA access network 122 and the WLA access network 142 may overlap and in which the WWA AN infrastructure 120 and the WLA AN infrastructure 140 may be managed via management server 110 for the enterprise network. In one instance, management server 110 may represent a single 'pane of glass' for managing control functions for the private WWA access and WLA access for system 100 (e.g., WLC 146, AMF 126, and SMF 128) as well as facilitating techniques described herein via WLA SON logic 112, WWA SON logic 114, HetNet fast handover logic 116, HetNet neighbor relationship logic 118. In one embodiment, the management server 110 may be implemented as a Cisco® Digital Network Architecture Center (DNAC or DNA-C).

Management server 110 may interface with AAA server 104, WLC 146, SMF 128, UPF 130, and (although not illustrated) WWA access nodes 124.1-124.N. The interfaces between nodes of the WWA AN infrastructure 120 and the management server 110 may be facilitated via any interface, such as an Application Programming Interface (API), vendor specific interfaces, etc. For the WWA AN infrastructure 120, SMF 128, and AMF 126 are control plane functions that may interface with each other. The AMF 126 may further interface with WWA access nodes 124.1-124.N of the private WWA access network 122. The UPF 130 is a user plane function for the WWA AN infrastructure 120 in which the UPF may interface with the SMF 128 and may further interface with WWA access nodes 124-124.N of the private WWA access network 122, as well as data network(s) 160.

Generally, the WWA AN infrastructure 120, may be configured to provide 3GPP private 4G/LTE, 5G/nG, and/or CBRS mobile network services via private WWA access network 122/WWA access nodes 144.1-144.N. WWA access nodes 144.1-144.N may be implemented as any combination of a 4G/LTE, 5G, and/or nG radio devices such as eNBs/eNodeBs, gNBs/gNodeBs, and/or a CBRS radio devices (CBSDs) and may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air Radio Frequency (RF) WWA access network connections (e.g., 4G/LTE, 5G/nG, CBRS, etc. connections) with one or more UE, such as UE 102.

A UE, such as UE 102, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a cellular/Wi-Fi® enabled telephone/smart phone, tablet, etc. and/or any other device, component, element, or object (e.g., a dual connection enabled device) capable of initiating voice, audio, video, media, or data exchanges within system 100. It is to be understood that UE 102 may also be configured with any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the air RF connections with one or more access networks.

In addition to various operations discussed for techniques herein, AMF 126 may provide access authentication services, authorization services, and mobility management control for one or more UE, such as UE 102, to facilitate one or more over-the-air RF connection(s) between the UE and private WWA access network 122/WWA access node(s) 124.1-124.M. In addition to various operations discussed for techniques herein, SMF 128 may be responsible for UE Protocol Data Unit (PDU) sessions or Session Management (SM), with individual functions/services being supported on a per-session basis, and also for selection and control of a UPF (e.g., UPF 130) to facilitate data transfer(s) between a UE and one or more data network(s), such as data network(s) 160. In addition to various operations discussed for techniques herein, UPF 130 may operate to provide routing and forwarding operations for user data traffic and may also perform a variety of functions/services including, but not limited to, packet inspection, traffic optimization, Quality of Service (QoS), billing, policy enforcement, and/or billing operations (e.g., accounting, etc.) for UE sessions.

AAA server 104 may facilitate any combination of authentication, authorization, and/or accounting services that may be utilized via any combination of authentication/authorization protocols such as Remote Authentication Dial-In User Service (RADIUS), Diameter, EAP [including any EAP variations], combinations thereof, and/or the like.

Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

For the WLA AN infrastructure 140, WLC 146 may interface with AAA server 104 as well as the WLA access nodes (APs) 144.1-144.M of the WLA access network 142. The WLC 146 may also interface with data network(s) 160. In various embodiments, WLA access nodes 144.1-144.M may be inclusive of a WLA radio device, such as a Wi-Fi/Wi-Fi6 access point and/or the like that may facilitate over-the-air RF connections for WLA access network 142. WLC 146 may provide/be responsible for WLA access network functions such as WLA access network-based access authentication services, authorization services, intrusion prevention, RF management, and/or the like to facilitate UE 102 connectivity via the WLA access network 142 utilizing the one or more WLA access nodes (APs) 144.1-144.M. In some implementations, WLC 146 may be configured as an evolved WLC (eWLC).

In various embodiments, data network(s) 160 may be any combination of the Internet, an Internet Protocol (IP) Multimedia Subsystem (IMS), Ethernet network, Ethernet switching system(s), and/or the like.

Figure 2:
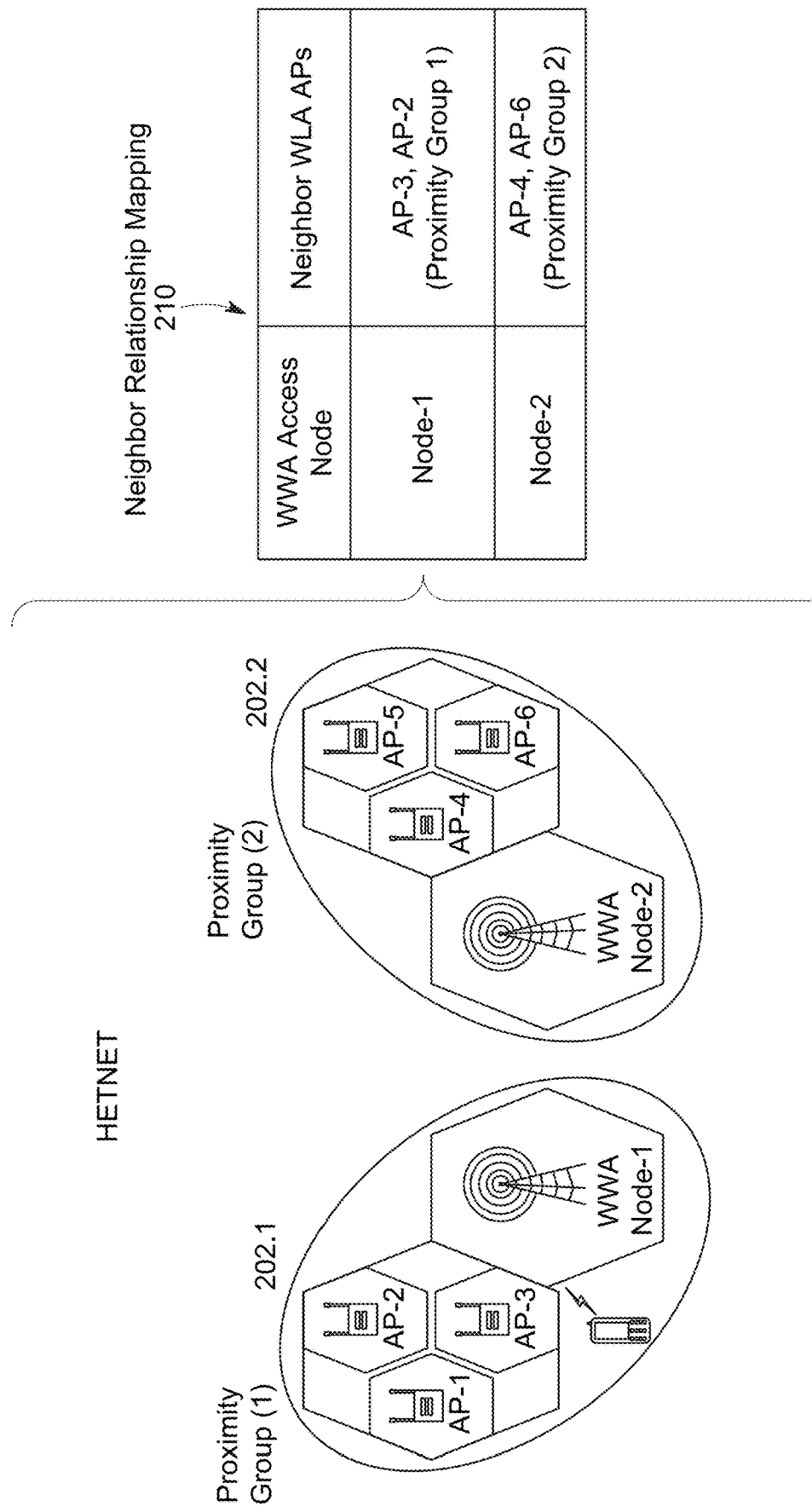
FIG. 2 is a diagram illustrating example details associated with neighbor relationship maps that may be generated for a heterogeneous access network, according to an example embodiment.

Consider various example operations involving the system 100 of FIG. 1 including operations 170 (170*a* and 170*b*), 171, 172, 173, 174, 175, 176 (176*a*, 176*b*, 176*c*, and 176*d*), 177 (177*a* and 177*b*), 178 (178*a* and 178*b*), and 179 discussed herein below, which may illustrate various example details associated with boot bootstrapping FT keys on one or more WLA access nodes based on private WWA access network information, which may include UE mobility events and proximity considerations involving WWA access nodes and WLA access nodes of system 100. Reference to FIG. 2 may be made to illustrate various example details associated with techniques herein.

Although not illustrated in FIG. 1, consider that various WLA access nodes (APs) 144.1-144.M may be deployed in proximity to certain WWA access nodes 124.1-124.N such that various nodes may be considered neighbors of each other in which the nodes may be geographically near or proximate to each other.

At 171, one or more neighbor relationship maps or mappings may be built or generated by HetNet neighbor relationship logic 118 using one or more techniques including, but not limited to: statically using a topology map fed into the system, which may be the simplest method; using WWA access node reported UE measurement reports (e.g., gNB measurement reports, CBSD measurement reports, etc. obtained from a UE by a WWA access node) such as Reference Signal Received Power (RSRP) and/or Reference Signal Received Quality (RSRQ) signal strengths of neighboring WWA access nodes (e.g., gNBs, CBSDs, etc.) and/or Received Signal Strength Indicator (RSSI) measurements of neighbor WLA access nodes/APs; WWA access node provided neighbor reports (Scanning) indicating neighbor WWA access nodes and WLA access nodes/APs; WLA access node/AP provided neighbor reports (Scanning) indicating neighbor WLA access nodes/APs and WWA access nodes; combinations thereof; and/or the like.

In one instance, WLA access node/AP neighbor reports can be gathered via WLA SON logic 112, as shown at 170a, which can monitor/interface with the WLA access nodes 144.1-144.M via WLC 146 to gather such reports for communication to HetNet neighbor relationship logic 118. In one instances, WWA access node neighbor reports can be gathered WWA SON logic 114, as shown at 170b, which can monitor/interface with the WWA access nodes 124.1-124.N to gather such reports for communication to HetNet neighbor relationship logic 118.

Referring to FIG. 2, FIG. 2 is a diagram illustrating example details associated with a neighbor relationship map or mapping 210 that may be built by a management server (e.g., management server 110 of FIG. 1) for an example HetNet access network 200, according to an example embodiment. As illustrated in the example of FIG. 2, the management server may build the neighbor relationship mapping 210 for a number of proximity groups 202, including a first proximity group 202.1 (shown in FIG. 2 as Proximity Group (1)) and a second proximity group 202.2 (shown in FIG. 2 as Proximity Group (2)). In some embodiments, proximity groups/relationships between WWA access nodes and WLA access nodes can be statically configured; however, in other embodiments, proximity groups can be configured based on any combination of UE measurement reports, WWA access node measurement/neighbor reports, and/or WLA access node measurement/neighbor reports communicated to the management server.

The first proximity group may include 202.1 may include a first WWA access node (WWA-1) and a number of WLA access nodes, AP-1, AP-2, and AP-3. The second proximity group 202.2 may include a second WWA access node (WWA-2) and a number of WLA access nodes AP-4, AP5, and AP-6.

Generally, a neighbor relationship mapping may provide details that identify one or more WLA access nodes that are proximate to or neighbor a given WWA access nodes. In various embodiments, WLA access nodes may be considered to 'neighbor' a given WWA access node based on any combination of a physical distance or range of physical distance and/or administrative distance/range. For example, in a factory floor, all WLA radios within a 200 meter range from a WWA radio may be considered as neighbors. In at least one embodiment, neighbor relationships may be manually defined by a network administrator based on various considerations, such as, mobility patterns, interference, geographic network layout, load, bandwidth, expected applications, combinations thereof, and/or the like.

For example, the example neighbor relationship mapping 210 for the example of FIG. 2 identifies for the first proximity group 202.1 that AP-2 and AP-3 are neighbors of the first WWA access node WWA-1 while AP-1 is not considered a neighbor of the WWA-1 access node (e.g., AP-1 may be beyond a particular distance for an AP to be considered as a neighbor). Further, for the second proximity group 202.2, the neighbor relationship mapping 210 identifies that AP-4 and AP-6 are neighbors of the second WWA access node WWA-2 while AP-5 is not considered a neighbor of the WWA-2 access node. In at least one embodiment, WLA access node(s) (AP(s)) that neighbor a given WWA access node can be identified using Basic Service Set Identifiers (BSSIDs) for the WLA access nodes (APs). WWA access nodes may be identified using 3GPP gNB identifiers.

The example of FIG. 2 is meant for illustrative purposes only and is not meant to limit the broad scope of the present disclosure. Other neighbor relationship mappings can be envisioned for a HetNet and, thus, are clearly within scope of the teachings of the present disclosure.

Returning to the example of FIG. 1 involving system 100, consider that a neighbor relationship mapping is built at 171 by management server 110 via HetNet neighbor relationship logic 118 that identifies one or more WLA access nodes 144 of the WLA AN 142 that neighbor each of WWA access node 124.1 and WWA access node 124.2 of the WWA AN 122. For the present example, consider that the neighbor relationship mapping identifies that WLA access nodes 144.1 and 144.2 neighbor WWA access node 124.1.

At 172 for the present example, consider that UE 102 attaches/connects to the private WWA access network 122 via WWA access node 124.1. For the attachment, UE 102 provides an indication to the private WWA access that that it supports a multiple access fast authentication (auth) capability, also referred to herein as a multiple access FT capability or an 802.11r FT capability. In one embodiment, the UE 102 may provide the indication within a registration request communicated to the WWA AN infrastructure 120 for connecting to the WWA access network 122. In various embodiments, the multiple access fast authentication capability may be provided in an Information Element (IE), one or more bit(s), byte(s), string(s), flag(s), and/or the like within a registration request communicated to the WWA AN infrastructure 120.

Further for the attachment/connection for UE 102 to the WWA access network 122, the WWA AN infrastructure 120 (e.g., AMF 126) may provide to the UE 102 a network identifier for the WLA access network 142, a pseudo-Network Access Identifier (pseudo-NAI) for the UE 102, and an identifier (AAA-ID) for AAA server 104, as shown at 173. In at least one embodiment, a network identifier for the WLA access network 142 may be a Service Set Identifier (SSID) for the WLA access network 142 (e.g., 'enterpriseWLA'). In at least one embodiment, the pseudo-NAI for the UE 102 may be any unique identifier for the UE 102 (e.g., 'user@realm') that may be encoded as International Mobile Subscriber Identity (IMSI) bits for the UE 102 that may be used to identify the UE within system 100. The encoding of a pseudo-NAI to IMSI can be implementation specific. In at least one embodiment, as there may be multiple AAA servers present in system 100, and the AAA-ID may be any unique identifier that may be used to identify AAA server 104 within the system. In some embodiments, the WWA AN infrastructure 120 may also provide a list of one or more BSSIDs for the WLA access nodes (APs) at which FT keys for the UE 102 can be cached based on neighbor relationship mapping information for with the WWA to which the UE 102 is connected. In various embodiments, an AAA-ID, such as the AAA-ID for AAA server 104, may be any alphanumeric string/value, binary value, hexadecimal value, a Fully Qualified Domain Name (FQDN) (e.g., dnaaa.enterprise.com), an IP address, and/or the like that can be used to uniquely identify the AAA server 104 within system 100.

Additionally for the attachment at 172, the UE 102 can generate a root security key, such an MSK, based on an EAP process performed with AAA server 104 and the AAA server also generates the root security key/MSK for the UE 102 attachment. The AAA server 104 can communicate the MSK to the HetNet fast handover logic 116. In various embodiments, the EAP process may include processes such as EAP Transport Layer Security (EAP-TLS) processes, EAP Tunneled TLS (EAP-TTLS), EAP Authentication and Key Agreement (EAP-AKA, which may be inclusive of EAP-AKA'), or the like.

At 174, the management server 110 via HetNet fast handover logic 116, provides an indication to the WWA access node 124.1 that it is to configure the UE 102 to report a WLA access network RSSI that exceeds a certain RSSI threshold (e.g., a cell edge threshold for the Wi-Fi network) within a measurement report for a reporting event, referred to herein as an 'Event W1' or 'W1 Event'.

In some embodiments, the management server 110, may configure the UE 102 to report WLA access network RSSI measurement reports as Event W1 utilizing the ReportConfigInterRAT IE as specified in 3GPP Technical Specification (TS) 36.331. Here, the RSSI threshold provided to the UE may correspond to the outer edge of a Wi-Fi cell (for example −75 to −80 decibel-milliwatts (dBm), which may signify the edge of the cell/coverage area of a Wi-Fi radio). Note, the ReportConfigInterRAT IE may be enhanced beyond current usage in order to identify the presence of an outer edge of a WLA access cell that may be used to determine the target APs at which to cache the FT keys. As a result, Event W1 can be triggered as a UE hears a WLA access node 144.1 (Wi-Fi AP) near the cell edge of the WWA access node 124.1 (gNB), which may result in a trigger to the management server 110 from the WWA access node for determining the target adjoining/neighboring WLA access nodes (APs) at which to cache FT keys for the UE 102. In such an implementation, the WWA access node 124.1 could optionally report the location of UE 102 to the management server 110 along with reporting the W1 event in some embodiments. In various embodiments, the location may be reported as WWA access node ID (e.g., gNB ID), Angle-of-Arrival (AoA), Observed-Time-Difference-of-Arrival (Observed-TDOA), network calculated location (e.g., triangulation calculations based on AoA, Observed-TDOA, etc.), Global Positioning System (GPS) coordinates, etc. In some implementations, such location information could be further utilized to limit the FT key generation/caching for certain nodes in the vicinity of the UE.

In some embodiments, as shown at 175, WLA access nodes 144.1 and 144.2 may provide (transmit) an indication that the WLA access network 142 supports the multiple access fast auth capability. In various embodiments, the indication can be provided by WLA access nodes (APs) in a Mobility Domain IE (MDIE) (e.g., a 'multiple access fast authentication' bit set in the MDIE) via a broadcast beacon and/or via a probe response.

At 176a, consider that UE 102 moves nearer to the WLA access network 142 (e.g., the Wi-Fi cell edge), in particular, WLA access node 144.1, and reports, at 176b, Event W1 to the WWA access node 124.1 upon reaching the WLA access network RSSI threshold in which the reporting event can be communicated from the WWA access node 144.1 to the HetNet fast handover logic 116. At 176c, the UE 102 can also derive the FT hierarchical keys, PMK-R0 and PMK-R1, based on the MSK root security key.

Additionally, at 176d, having built the HetNet neighbor relationship mapping for system 100, the management server 110 may also obtain mobility events for UE 102. In various embodiments, mobility events may include association and mobility events (generally, 3GPP access mobility events) from the SMF 128. Along with other information, as discussed below with reference to operations at 177, mobility events and the reporting event received from the UE 102 may provide trigger points or key points that, in combination with at least the HetNet relationship mapping for system 100, may result in selection of target WLA access nodes that may be potential targets for the UE 102 to roam to and at which FT hierarchical keys can be cached for the UE 102.

Thus, the management server 110 via HetNet fast handover logic 116 may track UE 102 mobility events such as association and handover events (e.g., S1 and/or X2 handovers for the WWA access network 122). These events may be obtained by HetNet fast handover logic 116 (e.g., utilizing push and/or pull techniques), which may analyze registration and mobility events and, in some embodiments, ongoing application session traffic for UE 102 (e.g., utilizing deep packet inspection (DPI) techniques, etc.) in order to determine application traffic type (e.g., if the UE is running a teleconference meeting, Augmented Reality (AR) applications, Virtual Reality (VR) applications, etc.) such that the HetNet fast handover logic 116 can determine, along with HetNet neighbor mapping information, potential neighbor WLA access nodes from a current WWA access node's association with the UE at which to pre-cache FT keys.

Thus, in accordance with various embodiments herein, that HetNet fast handover logic 116 may utilize any combination of HetNet neighbor relationship mapping information, UE reporting events, UE mobility events (e.g., association and/or handover events), application traffic type, and/or UE location in order to identify, as shown at 177a, one or more WLA access nodes that may neighbor a current WWA access not to which a given UE is connected in order to facilitate pre-caching FT hierarchical keys for the UE at the one more neighboring WLA access nodes. At 177b, management server 110 via HetNet fast handover logic 116, communicates the identified WLA access nodes 144.1 and 144.2 (for this example) that neighbor the WWA access node 124.1 (for this example) and the MSK for UE 102 (as generated at 172 by AAA server 104) to WLC 146 to facilitate caching FT hierarchical keys for UE 102 at the neighboring WLA access nodes.

At 178a, the WLC 146 derives/generates the FT hierarchical keys for UE 102 based on the MSK obtained from the management server 110 and, at 178b, transmits the keys proactively to the target identified WLA access nodes 144.1 and 144.2.

At 179, consider that the UE 102, upon obtaining the multiple access fast authentication indication from the WLA access network 142 and determining that the WLA access network supports the capability, associates to the WLA access network 142 for a first time by communicating a FT Authentication-Request (rather than an 802.11 Association) including an indication that the UE supports the multiple access fast authentication capability and an FT key index to WLA access node 144.1. In the FT key hierarchy, PMK-R1, for example, is generated from PMK-R0. After a client handover to a new AP, if the client and the new AP agree upon generating a new PMK-R1 from the same PMK-R0 key, the index is 1. But if another key is generated again, the index is incremented (e.g., to 2). As long as both the peers have the same understanding on the FT key index, they will arrive at the same key value.

As the WLA access node 144.1 is cached with the FT hierarchical keys for UE 102, the WLA access node 144.1 completes an FT 4-way handshake with UE 102 without involving the WLC 146 and the AAA server 104, which maintains IP address continuity for the UE 102, as no Dynamic Host Configuration Protocol (DHCP) process is performed for the UE for attachment to the WLA access network 142.

In another, more generalized example considering the neighbor relationship mapping 210 of FIG. 2, consider an example of involving a building 'A' of an enterprise campus with private WWA access nodes WWA-1 and WWA-2 deployed in the parking lot of building 'A' and another building 'B' in which keys FT keys can be proactively provisioned on APs in close proximity to the WWA access nodes. When an enterprise employee drives by the parking lot and is authenticated to the enterprise's private WWA access network in the parking lot, there is an opportunity to use the established key material to generate and push the FT keys to all the WLA access nodes/points in building 'A'. For this example, consider that a UE attaches to a WWA access node WWA-1 and automatically the FT keys for WLA AP-2 and AP-3 are setup. Later, if the user walks by the parking lot of building 'B', the FT keys can be automatically provisioned to the access points in building 'B'. For example, if the UE performs a handover to WWA-2, now the near WLA AP's, AP-4 and AP-6 can be set up. This approach of leveraging the authentication completion event on a private WWA access (e.g., private 5G access) as a technique to bootstrap FT keys, in a proactive manner, on all WLA AP's based on proximity considerations may greatly improve handover times for 3GPP access (e.g., 5G) to non-3GPP access (e.g., Wi-Fi) handovers.

Thus, embodiments herein provide for the ability to optimize the caching of FT hierarchical keys based on derived neighbor relationship between 3GPP WWA access nodes and one or more WLA access nodes, as well as, user equipment (UE) mobility triggers in the 3GPP access. Advantageously, embodiments herein may improve overall Association and Authentication time to a WLA access network (e.g., Wi-Fi) by providing security keys to APs before a UE is in the coverage area of an AP/hotspot.

Referring to FIGS. 3A, 3B, 3C, 3D, 3E, and 3F, FIGS. 3A, 3B, 3C, 3D, 3E, and 3F are a message sequence diagram illustrating a call flow 300 associated with bootstrapping FT keys on WLA access nodes based on private WWA access network information utilizing the system of FIG. 1, according to an example embodiment. FIGS. 3A-3F include UE 102, AAA server 104, WWA access node 124.1 for the private WWA access network 122, AMF 126, WLA access node 144.1 for the WLA access network 142, WLC 146, and management server 110 including WLA SON logic 112, WWA SON logic 114, HetNet fast handover logic 116, and HetNet neighbor relationship logic 118.

Following from the example operations 170-179 discussed above for FIG. 1, the example details discussed for call flow 300 only illustrate WWA access node 124.1 and WLA access node 144.1 in which FT keys for UE 102 are bootstrapped to WLA access node 144.1; however, the example details discussed for FIG. 3 are not meant to limit the broad scope of the present disclosure. It is to be understood that WLA access node 144.1 may belong to a group of WLA access nodes (APs) that may neighbor WWA access node 124.1 at which FT keys for UE 102 may also be bootstrapped in accordance with techniques described herein.

Further, example details described for FIGS. 3A-3F are discussed with reference to a 5G WWA access in which WWA access node 124.1 may be implemented as a gNB and a Wi-Fi WLA access in which WLA access node 144.1 may be implemented as a Wi-Fi AP, however, it is to be understood that techniques herein may be applicable to any combination of WWA and WLA accesses.

At 302, 304, 306, 308, 310, and 312, neighbor relationship mapping operations that may performed by management server 110 via WLA SON logic 112, WWA SON logic 114, and HetNet neighbor relationship logic 118. For example, at 302, WWA SON logic 114 obtains one or more neighbor reports from WWA access node 124.1 containing information (e.g., measurement information for transmissions from WLA access nodes, from other WWA access nodes, etc.) for one or more neighbor WLA access nodes that may be near (e.g., capable of being detected via received signal measurements) the WWA access node 124.1, such as at least WLA access node 144.1. Similarly, at 304, WLA SON logic 112 obtains one or more neighbor reports from WLA access node 144.1 containing information (e.g., measurement for transmissions from WWA access nodes, from other WLA access nodes, etc.) that may near (e.g., capable of being detected via received signal measurements) the WLA access node 144.1, such as at least WWA access node 144.1. At 306, UE measurement reports can be sent.

At 308, WWA SON logic 114 provides the WWA neighbor reports to HetNet neighbor relationship logic 118 along with an indication that the HetNet neighbor relationship logic 118 to build (or potentially update) a HetNet neighbor relationship map/mapping based, at least, in part, on the WWA neighbor reports. Similarly, at 310, WLA SON logic 112 provides the WLA neighbor reports to HetNet neighbor relationship logic 118 along with an indication that the HetNet neighbor relationship logic 118 to build (or potentially update) a HetNet neighbor relationship map/mapping based, at least in part, on the WLA neighbor reports. At 312, the HetNet neighbor relationship logic 118 builds (or potentially updates) a HetNet neighbor relationship map/mapping based on the obtained WWA and WLA neighbor reports that identifies one or more WLA access node(s) that may neighbor one or more WWA access node 124.1. For FIG. 3, for or example, consider that the neighbor relationship mapping identifies that at least WLA access node 144.1 neighbors WWA access node 124.1.

Figure 3A:
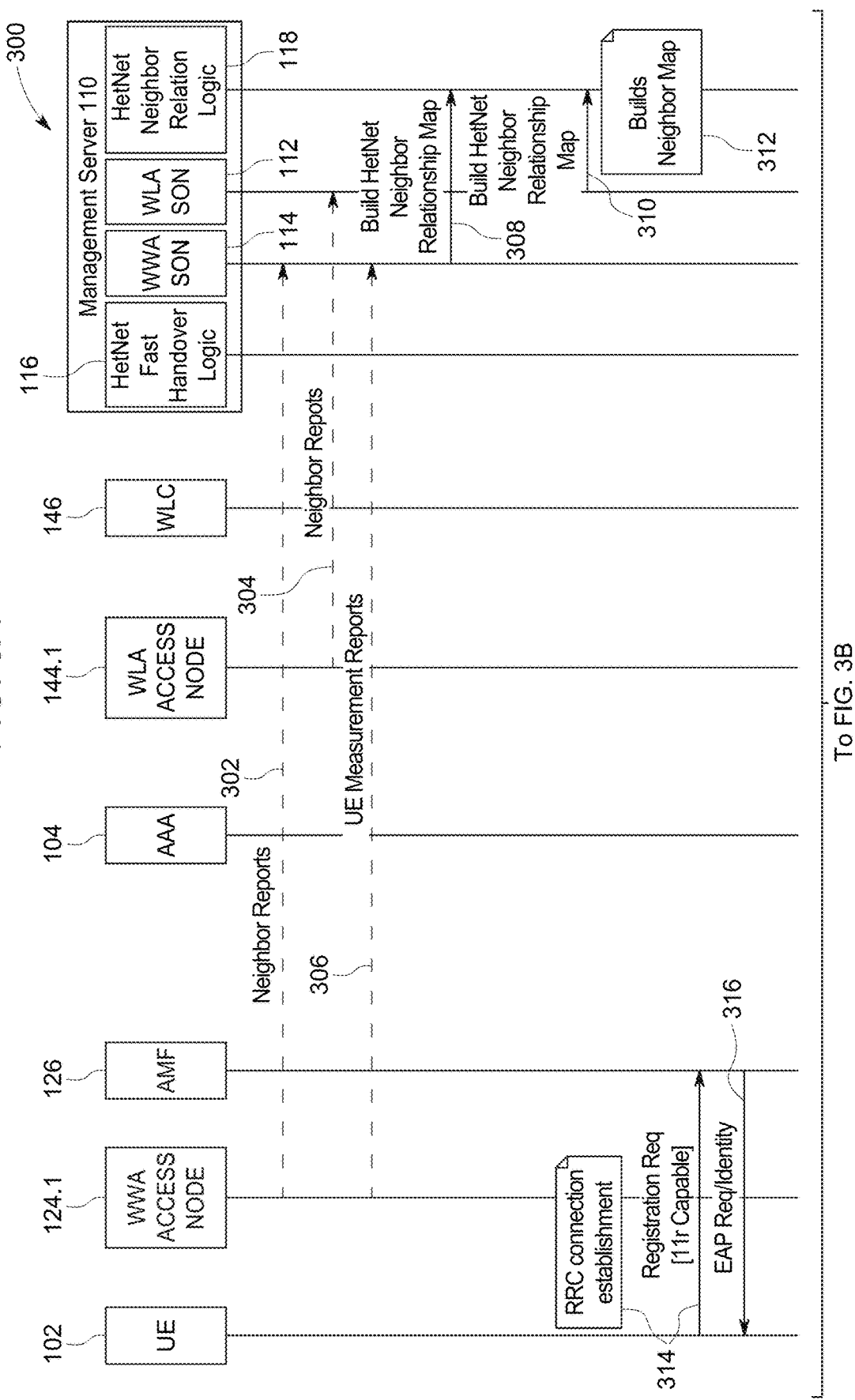
Figure 3B:
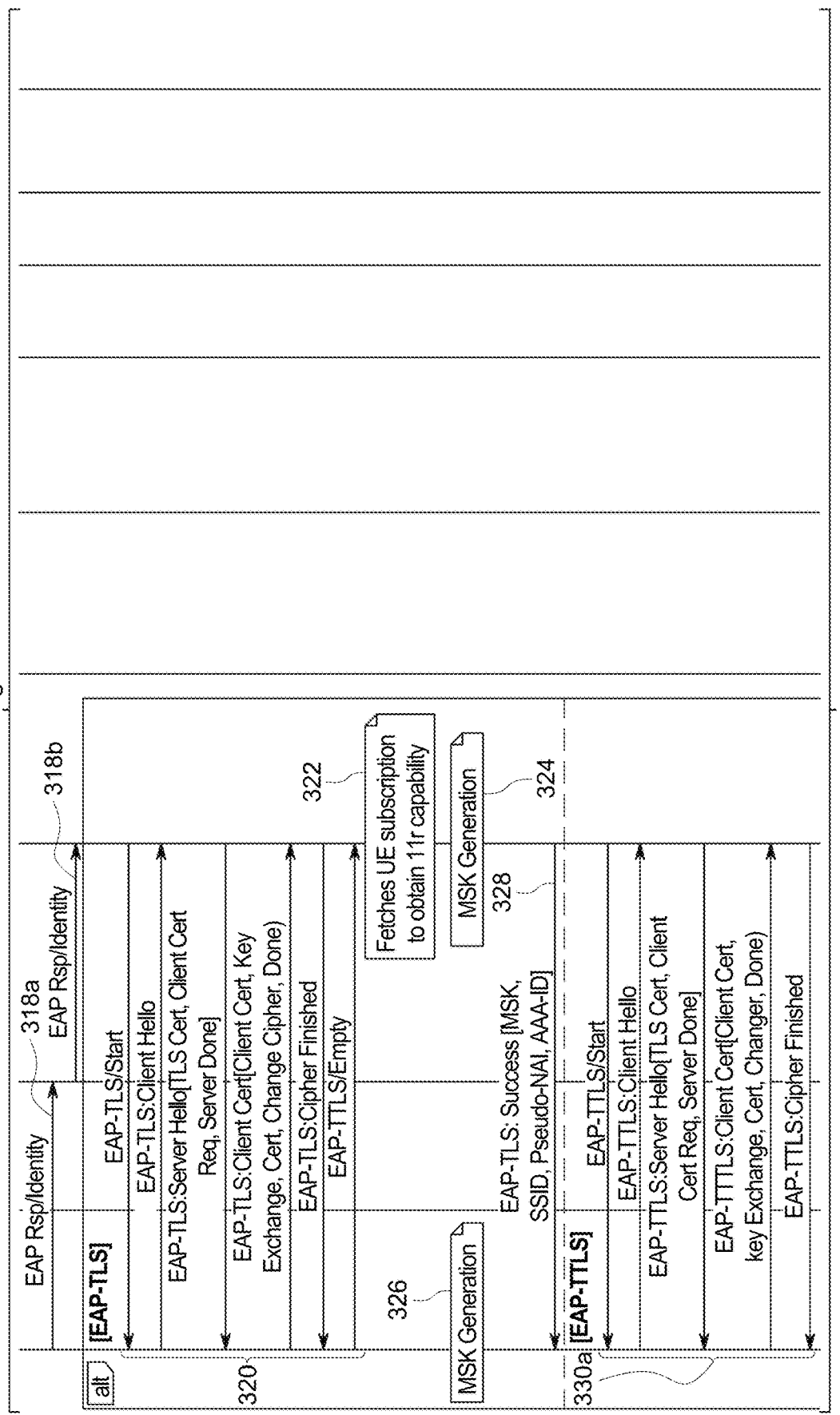

At 314, consider that a Radio Resource Control (RRC) connection is established for UE 102 and that UE 102 communicates a Registration Request to AMF 126 (via WWA access node 124.1) in which the Registration Request includes an indication that the UE 102 supports the multiple access fast authentication capability (e.g., an 802.11r Fast Transition capability). At 316, AMF 126 sends an EAP Request for the UE 102 identity to which UE 102 responds at 318a with an EAP Response including an identity of the UE 102 (e.g., 'userA@enterprise.com'), which the AMF 126 sends to AAA server 104 at 318b, as illustrated in FIG. 3B. In some instances, the AMF 126 can include the indication that the UE supports the Fast Transition capability in the message sent to the AAA server 104 at 318b, however, variations can be envisioned. For example, as discussed below, in some instances the AAA server 104 may also obtain the indication of the UE's Fast Transition capability from subscription information stored in any combination of an equipment identity register (EIR), a 3GPP Unified Data Management (UDM) entity, and/or Unified Data Repository (UDR).

Various types of EAP authentication can be performed for authenticating a UE for a private WWA access in accordance with embodiments herein, including, but not limited to EAP-TLS, EAP-TTLS, or EAP-AKA/EAP-AKA', which are discussed with reference to various optional operations as shown in FIG. 3.

For an EAP-TLS authentication, for example, an initial EAP-TLS exchange process 320 can be performed between UE 102 and AAA server 104 in which the EAP-TLS exchange process 320 may be performed as prescribed at least by IETF RFC 5216. Following the process 320 in which UE 102 is authenticated for the WWA access, the AAA server 104 performs MSK generation, as shown at 324, to generate an MSK (e.g., root security key) for the UE 102 connection and UE 102 also performs MSK generation, as shown at 326, to generate the MSK for the UE 102 connection. Following MSK generation, as shown at 328, AAA server 104, communicates an EAP-TLS Success message to UE 102 that includes the MSK, the SSID for the WLA access network 142 (e.g., 'enterpriseWLA'), a pseudo-NAI for the UE 102, and an identifier for the AAA server 104 (AAA-ID). The UE may store/maintain an association between the MSK, the SSID for the WLA access network, the pseudo-NAI, and the AAA-ID in order to perform fast authentication to the WLA access network, as discussed below.

In some embodiments if the UE 102 does not provide an indication that it has the multiple access fast authentication capability, the AAA server 104 may fetch subscription information for the UE 102, as shown at 322, via any of an enterprise EIR, a UDM, and/or a UDR, which may interface with AAA server 104 and store subscription information for users/UE associated with/managed by the enterprise entity. Determining the multiple access fast authentication capability for UE 102 can trigger the AAA server 104 to perform the MSK generation and provide the SSID, pseudo-NAI, and AAA-ID to the UE.

In another example, for an EAP-TTLS authentication, a Phase 1 EAP-TTLS exchange process 330a and a Phase 2 EAP-TTLS exchange process 330b can be performed between the UE 102 and the AAA server 104 as prescribed at least by IETF RFC 5281. For the Phase 1 EAP-TTLS exchange process 330a, MSK generation can be performed by the AAA server 104 at 334 and the UE 102 at 336, as shown in FIG. 3C. The optional operations at 332 may be performed by AAA server 104 as discussed above at 322. Following completion of the Phase 1 exchange process 330a, the Phase 2 process 330b is performed, which results in AAA server 104, communicating an EAP-TTLS Success message to UE 102, as shown at 338, that includes the MSK, the SSID for the WLA access network (142), a pseudo-NAI for the UE 102, and an identifier for the AAA server 104 (AAA-ID) in which the UE may store/maintain an association between the MSK, the SSID for the WLA access network, the pseudo-NAI, and the AAA-ID in order to perform fast authentication to the WLA access network, as discussed below.

In yet another example, for an EAP-AKA/EAP-AKA' authentication, an initial EAP-AKA/EAP-AKA' exchange process 340 can be performed between UE 102 and AAA 104 server as prescribed at least by IETF RFC 3748/4187/5448. Continuing to FIG. 3D, MSK generation can then be performed by the AAA server 104 at 344 and the UE 102 at 346. The optional operations at 342 may be performed by AAA server 104 as discussed above at 322. Following the MSK generation, as shown at 348, AAA server 104, communicates an EAP-Success message to UE 102 that includes the MSK, the SSID for the WLA access network (142), a pseudo-NAI for the UE 102, and an identifier for the AAA server 104 (AAA-ID) in which the UE may store/maintain an association between the MSK, the SSID for the WLA access network, the pseudo-NAI, and the AAA-ID in order to perform fast authentication to the WLA access network, as discussed below.

Thus, various EAP exchanges may be performed for authenticating a UE in accordance with embodiments herein. It is noted that, unlike a typically 802.11r, the UE 102 has no authenticated state for the WLA access network 142 at the point of the MSK generation in accordance with the embodiments of the present disclosure, as the UE 102 has not yet connected to the WLA access network. Thus, broadly, embodiments herein provide for the ability to push keys to WLA access nodes based on the UE's attachment to a different RAT (e.g., a WWA access network).

Continuing to 350, following a given EAP authentication for the UE 102, Non-Access Stratum (NAS) security communications can be performed between the UE 102 and the AMF 126 to complete attachment of the UE 102 to the WWA access network 122/WWA access node 122.1. As shown at 352, the attachment triggers AMF 126 to communicate an indication of the WWA (5G) attach event to the HetNet fast handover logic 116 that includes the pseudo-NAI for UE 102. The AAA-ID for the AAA server 104 may also be sent at 352 in some embodiments. For example, for implementations in which there may be only one server or a same server serving a given domain, AAA-ID may not need to be sent to the management server, however, for implementations involving multiple AAA servers for a domain, AAA-ID may be sent.

Obtaining the indication triggers the HetNet fast handover logic 116 to configure the W1 Event for UE 102, as shown at 354, via WWA access node 124.1, which instructs UE 102, at 356, to report the W1 Event in a measurement report. For example, the WWA access node 124.1 may configure the UE 102 to report a RSSI for the WLA access network 142 (based on the SSID for the WLA access network 142) that exceeds a certain RSSI threshold (e.g., a cell edge threshold for the Wi-Fi network) within a measurement report for the reporting event.

Consider at 358 that the UE 102 moves into the coverage of the WLA access node 144.1, which broadcasts the SSID for the WLA access network (e.g., 'enterpriseWLA'). At 360, consider that the WLA access network 142, via WLA access node 144.1, provides an indication that the WLA access network 142 supports the multiple access fast authentication capability. For example, in at least one embodiment as shown at 360a, the WLA access node 144.1 may broadcast an 802.11 Beacon that includes an FT capability and policy tag within the Mobility Domain IE (MDIE) with a bit set that indicates that the WLA access network 142 supports Fast Transition from a 3GPP (e.g., WWA) access. In another example, in at least one embodiment as shown at 360b, the WLA access node 144.1 may transmit an 802.11 Probe Response that includes an FT capability and policy tag within the Mobility Domain IE with a bit set that indicates that the WLA access network 142 supports Fast Transition from a 3GPP (e.g., WWA) access.

Obtaining the indication by the UE 102 that the WLA access network supports the 11r FT capability may trigger the UE 102 to initiate an FT 4-way handshake with WLA access node 134 to derive encryption keys for communication establishment for UE 102 to the WLA access network 132, as discussed in further detail below at 382, rather than performing a standard 802.11 4-way handshake.

Figure 3E:
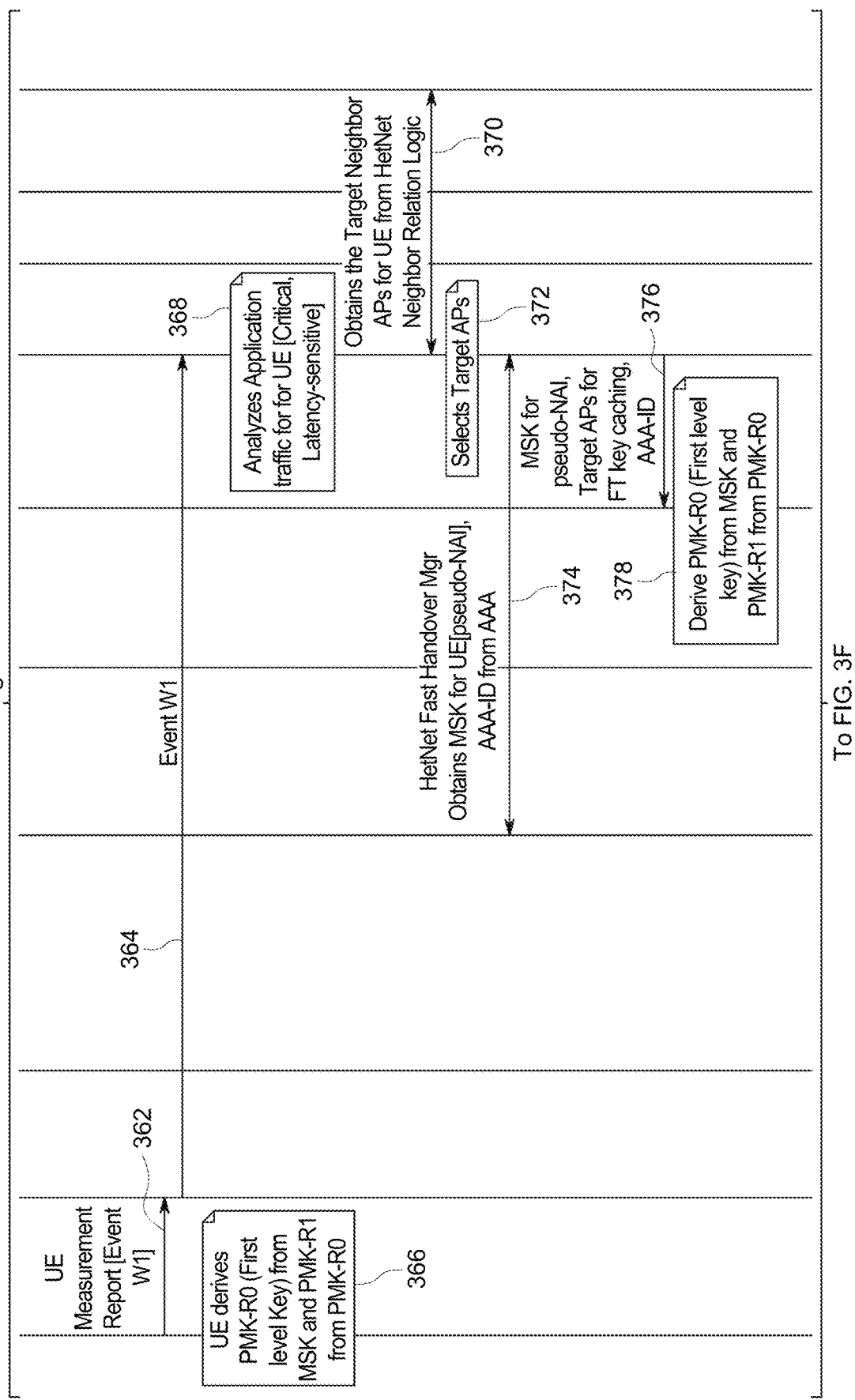
Figure 3F:
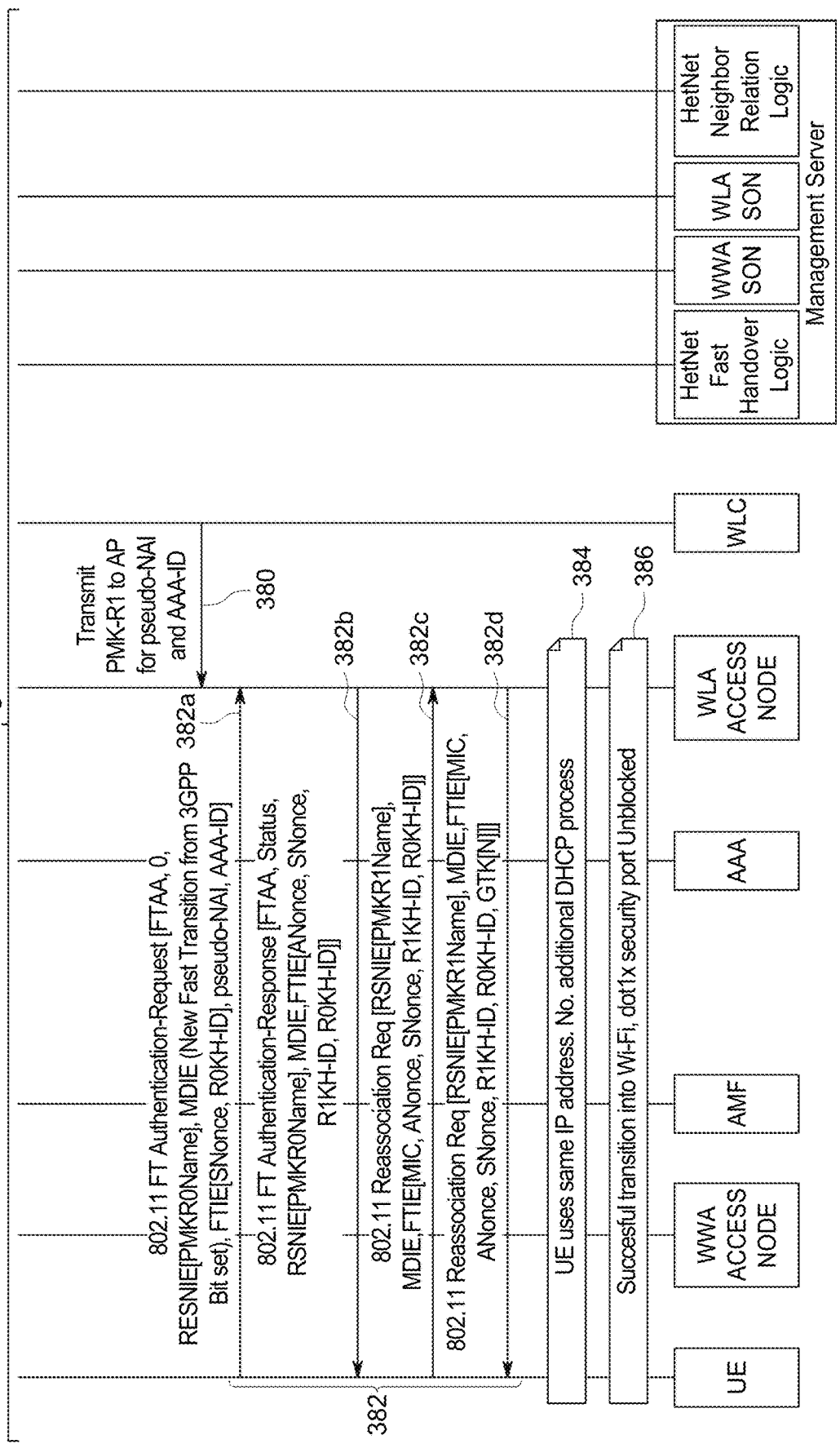

Continuing to FIG. 3E at 362, consider that the W1 Event is triggered for the UE 102 based on the UE 102 determining that the RSSI as measured for the WLA access node 124.1 (belonging to the SSID) exceeds the RSSI threshold configured for the reporting event, and the UE 102 communicates a measurement report to the WWA access node 124.1 for the W1 Event. The WWA access node 124.1 provides an indication of the W1 Event being triggered by the UE 102 to the HetNet fast handover logic 116, as shown at 364.

Consider, as shown at 366, that the UE derives/generates the first level FT key PMK-R0 from the MSK as generated from the EAP authentication and the second level FT key PMK-R1 from the first level key PMK-R0. Although operations at 366 are shown after 358 in the example of FIG. 3, it is to be understood that the operations at 366 may be performed at any time following generation of the MSK for the EAP authentication. For example, in some instances, the FT hierarchical key generation may be performed upon obtaining an indication by the UE 102 from the WLA access network 142 that it supports the multiple access fast authentication capability (e.g., as discussed at 360). In still some instances, the FT hierarchical key generation may be triggered upon determination by the UE 102 of the (W1) reporting event.

As shown at 370, obtaining the indication of the W1 event by the HetNet fast handover logic 116 may trigger the HetNet fast handover logic 116 to query the HetNet neighbor relationship logic 118 in order to obtain the one or more target neighbor WLA access node(s) that neighbor the WWA access node 124.1. In some instances, as shown at 368, the HetNet fast handover logic 116 may also analyze application traffic for the UE 102 in addition to obtaining the indication of the W1 event to determine whether any of the traffic may be critical, latency sensitive, etc., which may trigger the HetNet fast handover logic 116 to query the HetNet neighbor relationship logic 118 to determine the one or more target neighbor WLA access node(s) that neighbor the WWA access node 124.1. As discussed herein, other information may be utilized, such as UE association and/or mobility events, UE location, etc., which may trigger the HetNet fast handover logic 116 to query the HetNet neighbor relationship logic 118 to determine the one or more target neighbor WLA access node(s) that neighbor the WWA access node 124.1.

The operations at 370 include the HetNet neighbor relationship logic 118 identifying the one or more WLA access node(s) that neighbor the WWA access node 124.1, which includes WLA access node 144.1, based on the neighbor relationship map/mapping built at 312, and providing identifying information for the WLA access node(s) (e.g., BSSIDs, etc.) to the HetNet fast handover logic 116. As shown at 372, the HetNet fast handover logic 116 selects the target APs, including WLA access node 144.1, at which hierarchical FT keys for UE 102 are to be cached based on the identifying information obtained from the HetNet neighbor relationship logic 118.

As shown at 374, in at least one embodiment, the HetNet fast handover logic 116 queries the AAA server 104 for the MSK for UE 102 using the pseudo-NAI for the UE in which the AAA server 104 provides the MSK for UE 102 based on the query. In some embodiments, the query may include utilizing an AAA-ID obtained at 352 to identify the AAA server 104 for the query.

At 376, in at least one embodiment, the HetNet fast handover logic 116 provides to the WLC 146 the MSK for the UE 102 (identified by the pseudo-NAI), a list identifying the one or more target WLA access node(s) that neighbor the WWA access node 124.1, including WLA access node 144.1, and (optionally) the AAA-ID for AAA server 104. In another embodiment, the HetNet fast handover logic may provide the list and the AAA-ID to the WLC 146 and the WLC can obtain the MSK from the AAA server 104.

At 378, the WLC 146 derives/generates the first level FT key PMK-R0 from the MSK and the second level FT key PMK-R1 from the first level key PMK-R0. Continuing to FIG. 3F at 380, the WLC 146 transmits the second level FT key PMK-R1 to the target WLA access node(s), including WLA access node 144.1.

At 382 (382a, 382b, 382c, and 382d), a 4-way handshake is performed between UE 102 and WLA access node 144.1 to derive encryption keys for communication establishment for UE 102 to the WLA access network 142. For example, at 382a, the UE 102 initiates an 802.11 FT Authentication-Request that includes, among other information, an MDIE including the Fast Transition from 3GPP bit set, the pseudo-NAI for UE 102, and the AAA-ID for AAA server 104, which may trigger remaining handshake exchanges 382b, 382, and 382d to be performed between the UE 102 and the WLA access node 144.1, as prescribed at least by 802.11r.

Following the 4-way handshake, the same IP address is used for the UE 102 as was provided for the UE 102 for the WWA access and no DHCP processes are performed for the UE, as shown at 384. For example, within the domain of Fast Transition, it can be assumed that it is the same Layer-2 domain and the WWA allocated IP will still work for the UE in the WLA access. Further, it is noted that after fast transition to a new AP/radio (e.g., Wi-Fi to 3GPP, or 3GPP to Wi-Fi access), the UE will continue to use the same IP address. The network has the ability to provide the same IP address for that session. In another variation, the client, after completing the authentication at a new radio (same RAT or after changing RAT), may obtain a new IP address.

Successful transition for the UE 102 to the WLA access network 142 is completed as the dot1x security port is unblocked for the UE connection, as shown at 386.

Accordingly, techniques presented herein may enable caching of FT hierarchical keys based on a derived neighbor relationship between the 5G gNBs/CBSDs and a WLAN AP (e.g., a Wi-Fi® AP) and also UE mobility triggers in the 3GPP access.

Figure 4:
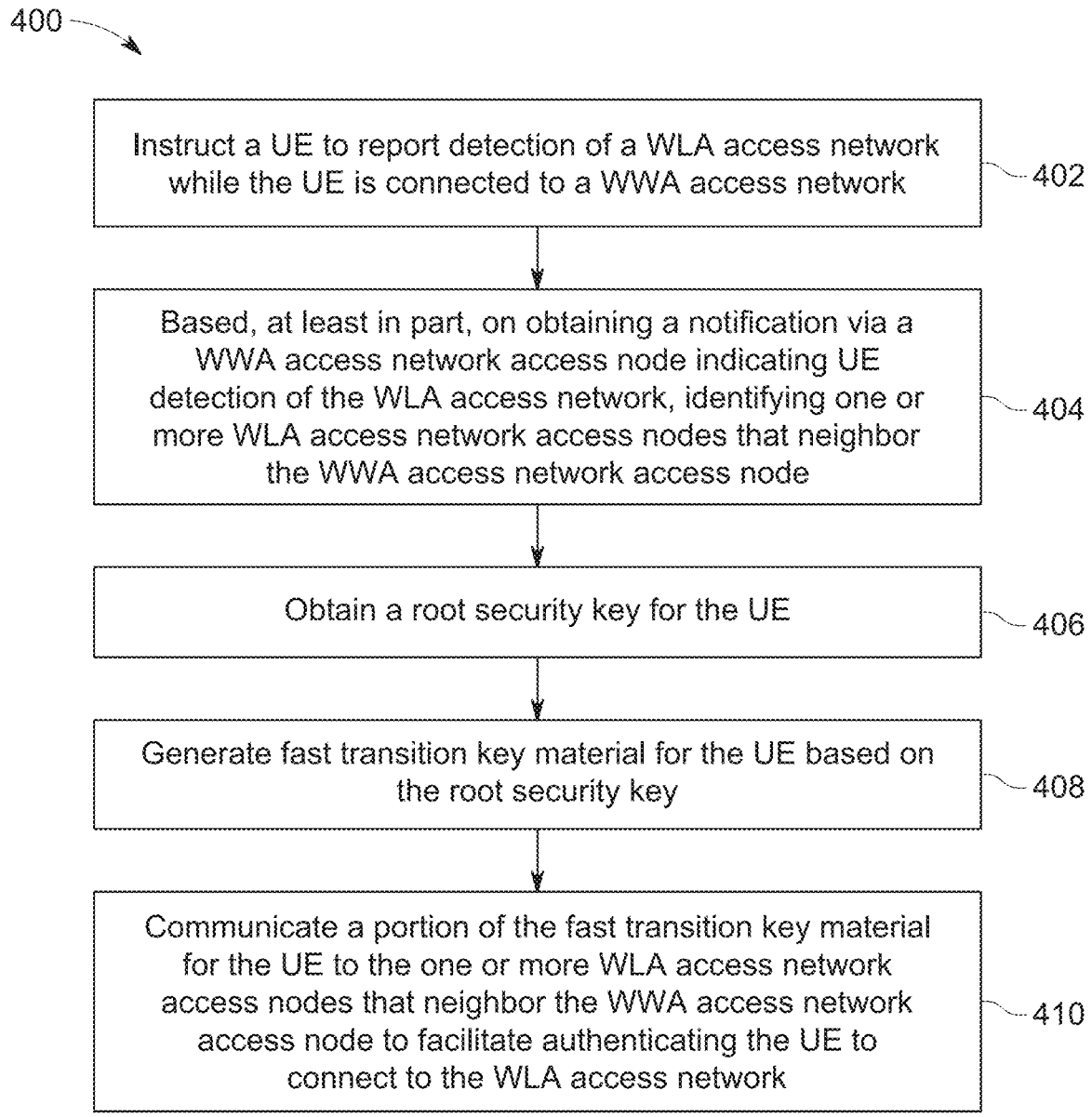
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed, at least in part, by WLC 146 and management server 110 via any combination of via WLA SON logic 112, WWA SON logic 114, HetNet fast handover logic 116, and HetNet neighbor relationship logic 118, in order to facilitate bootstrapping FT keys on one or more WLA access(s) nodes based on private WWA access network information.

For example, at 402, the method may include instructing a UE (e.g., UE 102) to report detection of a WLA access network (e.g., WLA access network 142) while the UE is connected to a WWA access network (e.g., WWA access network 122). For example, the HetNet fast handover logic 116 may configure the W1 Event for UE 102 and the WWA access node 124.1 may configure the UE 102 to report a RSSI for the WLA access network 142 (based on the SSID for the WLA access network 142) that exceeds a certain RSSI threshold (e.g., a cell edge threshold for the Wi-Fi network) within a measurement report for the reporting event.

At 404, the method may include based, at least in part, on obtaining a notification via a WWA access node indicating UE detection of the WLA access network, identifying one or more WLA access network access nodes that neighbor the WWA access network access node. For example, the HetNet fast handover logic 116 may obtain an indication of the W1 Event being triggered by the UE 102 from the WWA access node 124.1 and may query the HetNet neighbor relationship logic 118 in order to obtain the one or more target neighbor WLA access node(s) that neighbor the WWA access node 124.1. In some instances the HetNet fast handover logic 116 may also analyze application traffic for the UE 102 in addition to obtaining the indication of the W1 event to determine whether any of the traffic may be critical, latency sensitive, etc., which may trigger the HetNet fast handover logic 116 to query the HetNet neighbor relationship logic 118 to determine the one or more target neighbor WLA access node(s) that neighbor the WWA access node 124.1, such as WLA access node 144.1 and WLA access node 144.2, for example. As discussed herein, other information may be utilized, such as UE association and/or mobility events, UE location, etc., which may trigger the HetNet fast handover logic 116 to query the HetNet neighbor relationship logic 118 to determine the one or more target neighbor WLA access node(s) that neighbor the WWA access node 124.1.

In some instances, the operations at 404 may include the HetNet neighbor relationship logic 118 identifying the one or more WLA access node(s) that neighbor the WWA access node 124.1, based on a neighbor relationship map/mapping (e.g., built utilizing neighbor reports from the WWA and WLA access networks, configured by a network operator, etc.), and providing identifying information for the WLA access node(s) (e.g., BSSIDs, etc.) to the HetNet fast handover logic 116. The HetNet fast handover logic 116 may select the target WLA access nodes at which hierarchical FT keys for UE 102 are to be cached based on the identifying information obtained from the HetNet neighbor relationship logic 118.

At 406, the method may include obtaining a root security key for the UE. For example, the HetNet fast handover logic 116 may obtain the MSK for UE 102 from the AAA server 104. At 408, the method includes generating fast transition key material for the UE based on the root security key. For example, the HetNet fast handover logic 116 may provide the MSK for UE 102 to the WLC 146 along with a list identifying the one or more target WLA access node(s) that neighbor the WWA access node 124.1 and the WLC 146 can generate fast transition key material such as the PMK-R0 from the MSK and the PMK-R1 from the PMK-R0.

At 410, the method may include communicating a portion of the fast transition key material for the UE to the one or more WLA access network access nodes that neighbor the WWA access network access node to facilitate authenticating the UE to connect to the WLA access network. For example, the WLC 146 can provide the PMK-R1 to the one or more WLA access nodes 144.1 and 144.2 that may neighbor the WWA access node 124.1, in one example, in order to facilitate the authenticating the UE to the WLA access network 142 via a FT 4-way handshake, as discussed above for FIG. 3.

Figure 5:
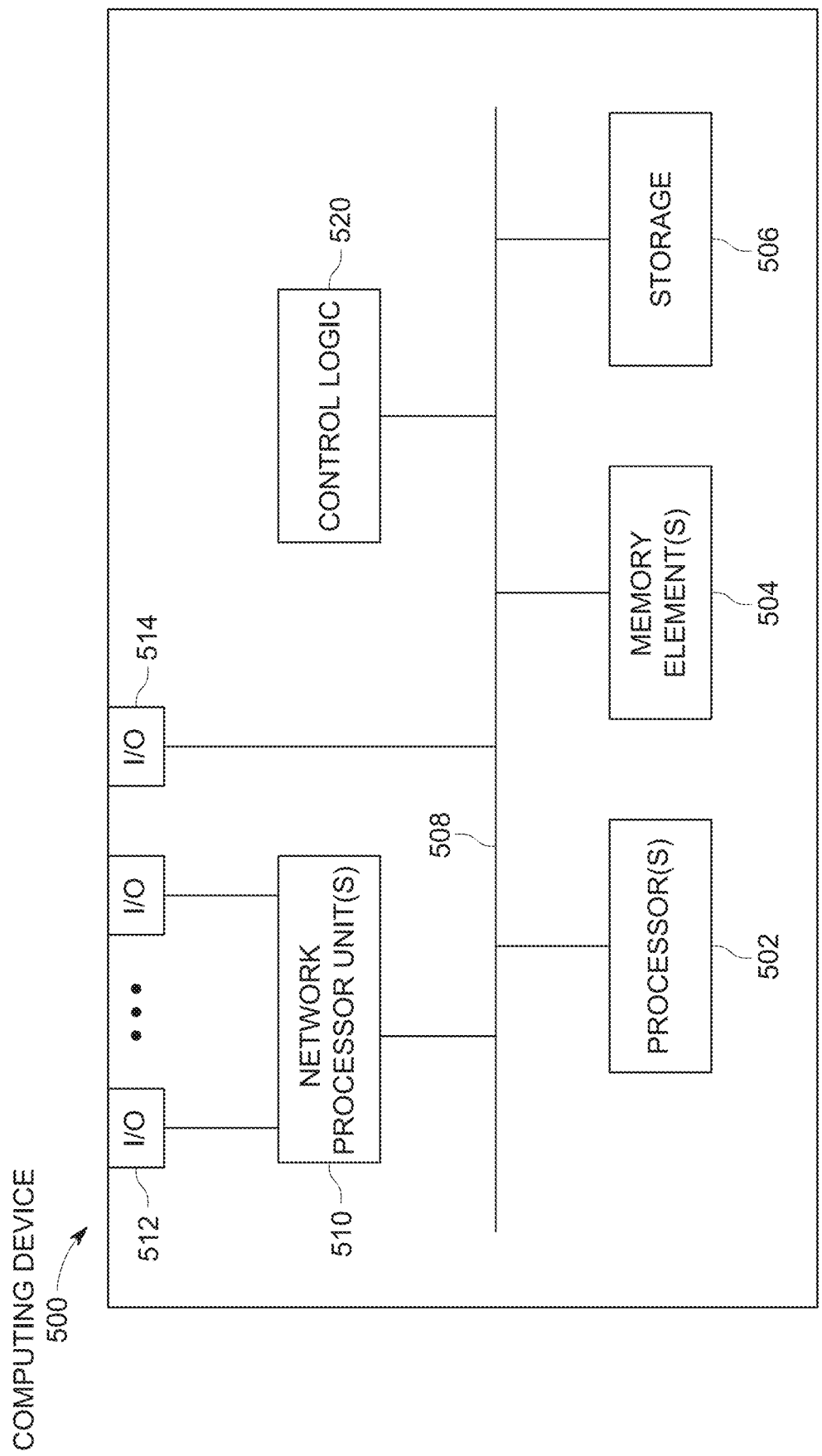
FIG. 5 is a hardware block diagram of a computing device that may perform functions associated with any combination of operations, in connection with the techniques depicted in FIGS. 1-4.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interfaces 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that includes instructing a user equipment (UE) to report detection of a wireless local area access network while the UE is connected to a wireless wide area access network; based, at least in part, on obtaining a notification via a wireless wide area access network access node indicating UE detection of the wireless local area access network, identifying one or more wireless local area access network access nodes that neighbor the wireless wide area access network access node; obtaining a root security key for the UE; generating fast transition key material for the UE based on the root security key; and communicating a portion of the fast transition key material for the UE to the one or more wireless local area access network access nodes that neighbor the wireless wide area access network access node to facilitate authenticating the UE to connect to the wireless local area access network. In one instance, the root security key for the UE is a Master Session Key (MSK) generated via an Extensible Authentication Protocol (EAP) exchange with the UE based on connection of the UE to the wireless wide area access network in which the MSK is utilized to facilitate authenticating the UE to connect to the wireless local area access network.

In one instance, the EAP exchange includes communicating a Service Set Identifier (SSID) for the wireless local area access network to the UE via the wireless wide area access network. In one instance, the notification obtained is a measurement report obtained from the UE indicating a Received Signal Strength Indication (RSSI) above a threshold value for at least one wireless local area access network node belonging to the SSID.

In one instance, the portion of the fast transition key material is communicated to the one or more wireless local area access network access nodes before the UE is connected to the wireless local area access network.

In one instance, the method includes obtaining an indication that the UE supports a multiple access fast authentication capability based on connection of the UE to the wireless wide area access network; and generating the root security key for the UE based on obtaining the indication that the UE supports the multiple access fast authentication capability. In one instance, the indication is obtained from the UE during connection of the UE to the wireless wide area access network.

In one instance, the method includes providing, by the wireless local area access network, an indication to the UE that the wireless local area access network supports a multiple access fast authentication capability. In one instance, the indication is provided via at least one of a broadcast by at least one wireless local area access network access node and a probe response transmitted by at least one wireless local area access network access node.

In one instance, the identifying is performed based on a neighbor relationship map indicating the one or more wireless local area access network access nodes that neighbor the wireless wide area access network access node. In one instance, the identifying is further based on one or more of: at least one of one or more association and handover events for the UE; application traffic for the UE; and a location of the UE.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   instructing, by a management node of an enterprise network that is operated by an enterprise entity, a user equipment (UE) to report detection of a wireless local area access network while the UE is connected to a private cellular access network operated by the enterprise entity that also operates the wireless local area access network;
   upon obtaining, by the management node of the enterprise network, a notification via a cellular access node of the private cellular access network indicating UE detection of the wireless local area access network, identifying a plurality of wireless local area access network access nodes that neighbor the cellular access node, wherein the identifying is based on a neighbor relationship map indicating the plurality of wireless local area access network access nodes that neighbor the cellular access node;
   obtaining, by the management node of the enterprise network, a root security key for the UE based on connection of the UE to the private cellular access network;
   generating fast transition key material for the UE based on the root security key; and
   communicating a portion of the fast transition key material for the UE to the plurality of wireless local area access network access nodes that neighbor the cellular access node to facilitate authenticating the UE to connect to the wireless local area access network.

2. The method of claim 1, wherein the root security key for the UE is a Master Session Key (MSK) generated via an Extensible Authentication Protocol (EAP) exchange with the UE based on connection of the UE to the private cellular access network in which the MSK is utilized to facilitate authenticating the UE to connect to the wireless local area access network.

3. The method of claim 2, wherein the EAP exchange includes communicating a Service Set Identifier (SSID) for the wireless local area access network to the UE via the private cellular access network.

4. The method of claim 3, wherein the notification obtained is a measurement report obtained from the UE indicating a Received Signal Strength Indication (RSSI) above a threshold value for at least one wireless local area access network node belonging to the SSID.

5. The method of claim 1, wherein the portion of the fast transition key material is communicated to the plurality of wireless local area access network access nodes before the UE is connected to the wireless local area access network.

6. The method of claim 1, further comprising:
   obtaining an indication that the UE supports a multiple access fast authentication capability based on connection of the UE to the private cellular access network; and
   generating the root security key for the UE based on obtaining the indication that the UE supports the multiple access fast authentication capability.

7. The method of claim 6, wherein the indication is obtained from the UE during connection of the UE to the private cellular access network.

8. The method of claim 1, further comprising:
   providing, by the wireless local area access network, an indication to the UE that the wireless local area access network supports a multiple access fast authentication capability.

9. The method of claim 8, wherein the indication is provided via at least one of a broadcast by at least one wireless local area access network access node and a probe response transmitted by at least one wireless local area access network access node.

10. The method of claim 1, wherein the identifying by the management node of the enterprise network is triggered based at least in part on a determination that traffic for the user equipment includes latency sensitive application traffic.

11. The method of claim 10, wherein the identifying triggered based additionally on at least one of:
    at least one of one or more association and handover events for the UE; and
    a location of the UE.

12. The method of claim 1, wherein the portion of the fast transition key material is a Pairwise Master Key R1 (PMK-R1).

13. One or more non-transitory computer readable storage media encoded with instructions that, when executed by a processor, cause the processor to perform operations, comprising:
  instructing, by a management node of an enterprise network that is operated by an enterprise entity, a user equipment (UE) to report detection of a wireless local area access network while the UE is connected to a private cellular access network operated by the enterprise entity that also operates the wireless local area access network;
  upon obtaining, by the management node of the enterprise network, a notification via a cellular access node of the private cellular access network indicating UE detection of the wireless local area access network, identifying, by the management node of the enterprise network, a plurality of wireless local area access network access nodes that neighbor the cellular access node, wherein the identifying is based on a neighbor relationship map indicating the plurality of wireless local area access network access nodes that neighbor the cellular access node;
  obtaining, by the management node of the enterprise network, a root security key for the UE based on connection of the UE to the private cellular access network;
  generating fast transition key material for the UE based on the root security key; and
  communicating a portion of the fast transition key material for the UE to the plurality of wireless local area access network access nodes that neighbor the cellular access node to facilitate authenticating the UE to connect to the wireless local area access network.

14. The media of claim 13, wherein the root security key for the UE is a Master Session Key (MSK) generated via an Extensible Authentication Protocol (EAP) exchange with the UE based on connection of the UE to the private cellular access network in which the MSK is utilized to facilitate authenticating the UE to connect to the wireless local area access network.

15. The media of claim 14, wherein the EAP exchange includes communicating a Service Set Identifier (SSID) for the wireless local area access network to the UE via the private cellular access network.

16. The media of claim 15, wherein the notification obtained is a measurement report obtained from the UE indicating a Received Signal Strength Indication (RSSI) above a threshold value for at least one wireless local area access network node belonging to the SSID.

17. A system comprising:
  at least one memory element for storing data; and
  at least one processor for executing instructions associated with the data, wherein executing the instructions causes the system to perform operations, comprising:
    instructing, by a management node of an enterprise network operated by an enterprise entity, a user equipment (UE) to report detection of a wireless local area access network while the UE is connected to private cellular access network operated by the enterprise entity that also operates the wireless local area access network;
    upon obtaining, by the management node of the enterprise network, a notification via a cellular access node of the private cellular access network indicating UE detection of the wireless local area access network, identifying a plurality of wireless local area access network access nodes that neighbor the cellular access node, wherein the identifying is based on a neighbor relationship map indicating the plurality of wireless local area access network access nodes that neighbor the cellular access node;
    obtaining, by the management node of the enterprise network, a root security key for the UE based on connection of the UE to the private cellular access network;
    generating fast transition key material for the UE based on the root security key; and
    communicating a portion of the fast transition key material for the UE to the plurality of wireless local area access network access nodes that neighbor the cellular access node to facilitate authenticating the UE to connect to the wireless local area access network.

18. The system of claim 17, wherein the root security key for the UE is a Master Session Key (MSK) generated via an Extensible Authentication Protocol (EAP) exchange with the UE based on connection of the UE to the private cellular access network in which the MSK is utilized to facilitate authenticating the UE to connect to the wireless local area access network.

19. The system of claim 18, wherein the EAP exchange includes communicating a Service Set Identifier (SSID) for the wireless local area access network to the UE via the private cellular access network.

20. The system of claim 19, wherein the notification obtained is a measurement report obtained from the UE indicating a Received Signal Strength Indication (RSSI) above a threshold value for at least one wireless local area access network node belonging to the SSID.

* * * * *